US012676487B2

(12) United States Patent
Moslehi et al.

(10) Patent No.: US 12,676,487 B2
(45) Date of Patent: Jul. 7, 2026

(54) MULTI-MODAL MAXIMUM POWER POINT TRACKING OPTIMIZATION SOLAR PHOTOVOLTAIC SYSTEM

(71) Applicant: SIGMAGEN INC., Los Altos, CA (US)

(72) Inventors: Mehrdad M. Moslehi, Los Altos, CA (US); Benjamin Sheahan, Los Altos, CA (US); Gary Kendall, Los Altos, CA (US)

(73) Assignee: SIGMAGEN, INC., Los Altos, CA (US)

( * ) Notice: Subject to any disclaimer, the term of this patent is extended or adjusted under 35 U.S.C. 154(b) by 0 days.

(21) Appl. No.: 18/794,418

(22) Filed: Aug. 5, 2024

(65) Prior Publication Data

US 2025/0047100 A1 Feb. 6, 2025

Related U.S. Application Data

(63) Continuation of application No. 18/201,556, filed on May 24, 2023, now Pat. No. 12,062,919, which is a
(Continued)

(51) Int. Cl.
*H02J 3/38* (2006.01)
*H02M 3/158* (2006.01)
(Continued)

(52) U.S. Cl.
CPC ............. *H02J 3/381* (2013.01); *H02M 3/158* (2013.01); *H02J 2101/25* (2026.01); *H02M 1/08* (2013.01)

(58) Field of Classification Search
CPC ...... H02J 3/381; H02J 2300/26; H02M 3/158; H02M 1/08; Y02E 10/56; G05F 1/67
See application file for complete search history.

(56) References Cited

U.S. PATENT DOCUMENTS

| 8,158,877 B2 * | 4/2012 | Klein | H02J 3/46 |
| | | | 320/101 |
| 8,472,220 B2 | 6/2013 | Garrity | |

(Continued)

OTHER PUBLICATIONS

Patent Cooperation Treaty, Inlemalional Preliminary Report on Palenlability, issued in PCT/US2016/063209, May 31, 2018, pp. 1-13.

*Primary Examiner* — Daniel Kessie
*Assistant Examiner* — Brian K Baxter
(74) *Attorney, Agent, or Firm* — Pillsbury Winthrop Shaw Pittman LLP

(57) ABSTRACT

A multi-modal maximum power point tracking optimization solar photovoltaic system is provided. A maximum power point tracking optimizer is connected to and powered by at least one solar cell. The maximum power point tracking optimizer configured to operate: in a pass-through mode when said at least one solar cell voltage is greater than a pass-through threshold and greater than a ratio of the open-circuit voltage of said at least one solar cell, said pass-through mode flowing current through a pass-through circuit; in an optimizing mode when said at least one solar cell voltage is greater than an optimizing threshold and less than a ratio of the open-circuit voltage of said at least one solar cell, said optimizing mode modulating current flow using a DC-to-DC switching circuit to direct the voltage of said at least solar cell towards said ratio of the open-circuit voltage; in an active bypass mode when said at least one solar cell voltage is less than an active bypass threshold, said active bypass mode flowing current through an active bypass circuit.

20 Claims, 10 Drawing Sheets

Related U.S. Application Data continuation of application No. 17/513,662, filed on Oct. 28, 2021, now abandoned, which is a continuation of application No. 15/777,576, filed as application No. PCT/US2016/063209 on Nov. 21, 2016, now Pat. No. 11,190,021.

(60) Provisional application No. 62/257,698, filed on Nov. 19, 2015.

(51) Int. Cl.
*H02J 101/24* (2026.01)
*H02M 1/08* (2006.01)

(56) References Cited

U.S. PATENT DOCUMENTS

| | | | | |
|---|---|---|---|---|
| 8,576,591 | B2 * | 11/2013 | Phadke | H02J 1/10 |
| | | | | 363/124 |
| 8,810,068 | B2 * | 8/2014 | Lisi | H10F 77/955 |
| | | | | 307/82 |
| 8,837,182 | B2 * | 9/2014 | Min | G05F 1/67 |
| | | | | 363/95 |
| 8,842,397 | B2 * | 9/2014 | Fahrenbruch | H10F 77/955 |
| | | | | 361/1 |
| 9,063,559 | B2 * | 6/2015 | Ivanov | H02J 7/35 |
| 9,281,419 | B2 | 3/2016 | Klein | |
| 9,800,053 | B2 * | 10/2017 | Beitel | H10F 19/80 |
| 9,837,556 | B2 * | 12/2017 | Jergovic | H10F 77/937 |
| 10,153,383 | B2 * | 12/2018 | Foss | G05F 1/67 |
| 10,181,541 | B2 | 1/2019 | Moslehi | |
| 10,705,551 | B2 | 7/2020 | Adest | |

| | | | | |
|---|---|---|---|---|
| 2010/0181923 | A1 | 7/2010 | Hoogzaad | |
| 2011/0134668 | A1 * | 6/2011 | Cho | G05F 1/67 |
| | | | | 363/78 |
| 2011/0175454 | A1 * | 7/2011 | Williams | H10F 77/955 |
| | | | | 307/82 |
| 2011/0221416 | A1 | 9/2011 | Ivanov et al. | |
| 2012/0080943 | A1 | 4/2012 | Phadke | |
| 2012/0081933 | A1 | 4/2012 | Garrity | |
| 2012/0081937 | A1 | 4/2012 | Phadke | |
| 2012/0085384 | A1 | 4/2012 | Beitel et al. | |
| 2012/0097219 | A1 | 4/2012 | Takagi et al. | |
| 2012/0223584 | A1 * | 9/2012 | Ledenev | H02J 3/388 |
| | | | | 307/43 |
| 2012/0300347 | A1 | 11/2012 | Fahrenbruch et al. | |
| 2013/0106194 | A1 | 5/2013 | Jergovic et al. | |
| 2013/0328403 | A1 | 12/2013 | Kaufman et al. | |
| 2014/0060610 | A1 | 3/2014 | Moslehi | |
| 2014/0070614 | A1 * | 3/2014 | Lo | H02J 3/381 |
| | | | | 307/43 |
| 2014/0103723 | A1 | 4/2014 | Jergovic et al. | |
| 2014/0103892 | A1 | 4/2014 | Mcjimsey et al. | |
| 2014/0176043 | A1 | 6/2014 | Fujiyama | |
| 2015/0013744 | A1 | 1/2015 | Kim | |
| 2015/0013748 | A1 | 1/2015 | Garabandic | |
| 2015/0236182 | A1 | 8/2015 | Moslehi | |
| 2016/0087579 | A1 | 3/2016 | Moslehi | |
| 2016/0197508 | A1 | 7/2016 | Kruiskamp | |
| 2016/0365733 | A1 * | 12/2016 | Judkins | H02S 50/00 |
| 2017/0222441 | A1 | 8/2017 | Chen | |
| 2017/0308110 | A1 | 10/2017 | Ahmed | |
| 2020/0064899 | A1 | 2/2020 | Obie et al. | |
| 2020/0251907 | A1 | 8/2020 | Hester et al. | |
| 2020/0303924 | A1 | 9/2020 | Moslehi | |
| 2021/0126580 | A1 | 4/2021 | Moslehi | |

* cited by examiner

| MODE | V+ -- V- | Vsw -- V- | BLOCK | | | | | | | | |
| --- | --- | --- | --- | --- | --- | --- | --- | --- | --- | --- | --- |
| | | | BIAS | CONTROL | DRIVER_HS (including charge pump) | DRIVER_LS | NFET_HS | NFET_LS | SBR | Boost | |
| Sleep Mode | 0 | 0 | off | off | off | off | off | off | off | OFF | |
| Super Barrier Rectifier Bypass | 0 to 4.75V Rising 4.25V to 0V Falling | 0 to -1V | off | off | off | off | off | off | on | OFF | |
| Active Bypass | 4.5V to 5.0V Rising 4.75V to 4.25V Falling | >-0.1V | on | On | ON | on | off | on | off | ON | Boost Capacitor Continuously Charged |
| Optimizing Mode | 5 to Vmax_power Rising to 4.75V Falling | >-0.1V | on | on | on | on | on | on | off | ON | Boost Capacitor Re-Charged at 500KHz |
| Pass Through Mode | > Vmax_power (VP - VM > 0.76 x VOC) | near to vin | on | on | on | off | on | off | off | ON (Refresh) | Boost Capacitor Re-Charged at 1KHz. However at Low Current (Low Light in Morning and Evening Low Side FET is turned off too quickly) |
| Solar PV Cell Open Circuit Sampling | 5V to Vopen_circuit Rising to 4.75V Falling | >-0.1 | ON | ON | OFF | ON | OFF | ON | OFF | ON | Boost Capacitor Continuously Charged |

*Fig. 7*

MULTI-MODAL MAXIMUM POWER POINT TRACKING OPTIMIZATION SOLAR PHOTOVOLTAIC SYSTEM

CROSS REFERENCE TO RELATED APPLICATIONS

This application is a Continuation of U.S. patent application Ser. No. 18/201,556, filed May 24, 2023, which is a Continuation of U.S. patent application Ser. No. 17/513,662, filed Oct. 28, 2021, which is a Continuation of U.S. patent application Ser. No. 15/777,576, filed May 18, 2018, now U.S. Pat. No. 11,190,021, issued Nov. 30, 2021, which is a U.S. National Phase of PCT/US2016/063209, filed Nov. 21, 2016, which claims priority to U.S. provisional patent application 62/257,698 filed on Nov. 19, 2015, all of which are hereby incorporated by reference in the present disclosure in their entirety.

FIELD OF THE INVENTION

The present disclosure relates in general to the fields of solar photovoltaics (PV), and more particularly to maximum power point tracking and solar photovoltaic systems.

BACKGROUND

As solar photovoltaic (PV) cells and solar PV systems become more widespread, these technologies will increasingly benefit from improved power harvesting. Solar PV installations are installed in a wide variety locations and thus subject to varying changes in sunlight, shading, and temperature all of which impact solar PV cell power generation. These varying changes may impact the power generation of solar PV cells electrically connected in the same solar PV system differently. Additionally, solar PV cells connected in the same module, panel, or string, may have power generation variances under the same conditions, even when the cells were fabricated alike, due to inherent solar cell structural variances. Solar PV cell failures and electrical connection failures also contribute to power generation variances. Solar PV cell power generation variances often hampers and reduces solar PV cell and solar PV system power harvesting.

BRIEF SUMMARY OF THE INVENTION

Therefore, a need has arisen for a maximum power point tracking optimization solar photovoltaic system providing improved power harvesting. In accordance with the disclosed subject matter, a multi-modal maximum power point tracking optimization solar photovoltaic systems are provided which may substantially eliminate or reduces disadvantage and deficiencies associated with previously developed maximum power point tracking optimization solar photovoltaic systems.

According to one aspect of the disclosed subject matter, a multi-modal maximum power point tracking optimization solar photovoltaic system is provided. A maximum power point tracking optimizer is connected to and powered by at least one solar cell. The maximum power point tracking optimizer configured to operate: in a pass-through mode when said at least one solar cell voltage is greater than a pass-through threshold and greater than a ratio of the open-circuit voltage of said at least one solar cell, said pass-through mode flowing current through a pass-through circuit; in an optimizing mode when said at least one solar cell voltage is greater than an optimizing threshold and less than a ratio of the open-circuit voltage of said at least one solar cell, said optimizing mode modulating current flow using a DC-to-DC switching circuit to direct the voltage of said at least solar cell towards said ratio of the open-circuit voltage; in an active bypass mode when said at least one solar cell voltage is less than an active bypass threshold, said active bypass mode flowing current through an active bypass circuit.

The photovoltaic system comprises a photovoltaic module attached to a photovoltaic mount frame, the mount frame having a rectangular shape. A deflector is attached to the mount frame by a rotatable deflector and mount frame attachment wherein the deflector pivots around the rotatable deflector and mount frame attachment from a nesting position under the photovoltaic module in the mount frame to an installation position raising at least a first side of the mount frame. A mount foot is attached to the deflector by a rotatable mount foot and deflector attachment wherein the mount foot pivots around the rotatable mount foot and deflector attachment from a nesting position in a mount foot nesting indention in the deflector to an installation position planar to a mounting surface.

These and other aspects of the disclosed subject matter, as well as additional novel features, will be apparent from the description provided herein. The intent of this summary is not to be a comprehensive description of the claimed subject matter, but rather to provide a short overview of some of the subject matter's functionality. Other systems, methods, features and advantages here provided will become apparent to one with skill in the art upon examination of the following figures and detailed description. It is intended that all such additional systems, methods, features and advantages that are included within this description, be within the scope of any claims.

BRIEF DESCRIPTION OF THE DRAWINGS

The features, natures, and advantages of the disclosed subject matter may become more apparent from the detailed description set forth below when taken in conjunction with the drawings (dimensions, relative or otherwise not drawn to scale) in which like reference numerals indicate like features and wherein:

FIG. 7 is a table showing an MPPT optimizer consistent with FIG. 6A in different modes.

DETAILED DESCRIPTION

Figure 1:
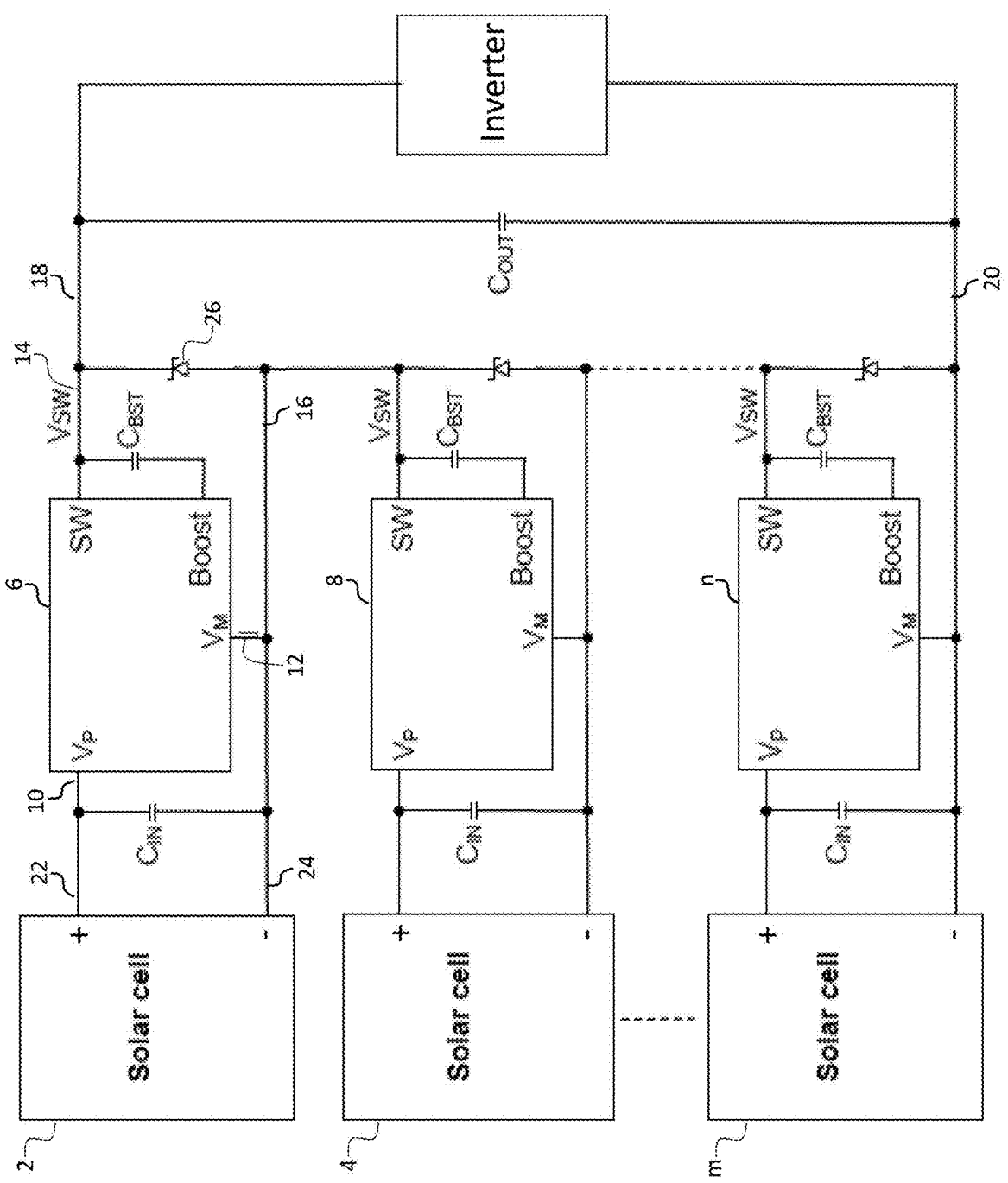
FIG. 1 is a diagram showing a distributed maximum-power-point tracking (MPPT) power optimization solar photovoltaic system in accordance with the disclosed subject matter.

The following description is not to be taken in a limiting sense, but is made for the purpose of describing the general principles of the present disclosure. The scope of the present disclosure should be determined with reference to the claims. Exemplary embodiments of the present disclosure are illustrated in the drawings, like aspects and identifiers being used to refer to like and corresponding parts of the various drawings.

And although the present disclosure is described with reference to specific embodiments, fabrication and installation processes, and materials, one skilled in the art could apply the principles discussed herein to other electronic components, solar photovoltaic systems comprising combinations of solar cells, electronic components such as integrated circuits (IC) and IC packages, fabrication and installation processes, as well as alternative technical areas and/or embodiments without undue experimentation. Solar PV cells are described with reference to crystalline silicon solar cells, however the solar cells may be thin-film solar cells or alternative solar PV cell structures.

The comprehensive solar photovoltaic (PV) system multi-modal maximum-power-point tracking (MPPT) power optimization solution provided advantageously allows for improved distributed solar PV cell and module power harvesting and maximum-power-point tracking power optimization with increased operational efficiency, enhanced power & energy harvesting, and substantially reduced failure points. Particularly, the solar PV system multi-modal maximum-power-point tracking optimization solution disclosed and described here provides for improved power harvesting of an individual solar cell or combination of electrically connected solar cells for distributed maximum-power-point tracking power optimization at a relatively low power generation level of the system (e.g., including but not limited to that generating a voltage in the range of about 4.5V to 10.5V) and optimizes the power harvesting and reduces the system drain (or power dissipation) of that corresponding solar cell or combination of electrically connected solar cells, relatively autonomously and independently of other electrically connected solar cells (e.g., other electrically connected solar cells in the same string of the solar cell, and/or combination of various solar cells in a photovoltaic module laminate, being optimized).

Structural and functional innovation such as but not limited to system level design, multi-modal MPPT structure and optimization algorithm modes, and current averaging/smoothing through parasitic inductance of connection wirings result in reduced MPPT insertion loss and smooth power adjusting and regulation to provide efficient and effective autonomous self-powered power optimization at a lower system power generation level (for distributed MPPT power optimization localized to the lower system power generation level).

The distributed multi-modal maximum-power-point tracking (MPPT) power optimization solution provided is particularly designed for and advantageously used as an embedded and distributed MPPT solution with reduced electronic failure points (and excellent long-term operational reliability) and improved tracking accuracy and operational efficiency for enhanced and fail-safe power harvesting under a wide range of operating conditions (over a wide range of sunlight irradiance amounts, ambient temperature values, etc.). These solutions are described with reference to distributed solar cell (or solar cell string) MPPT power optimizer integrated circuit (IC) package for regulating the output voltage of a solar cell (or a string of electrically connected solar cells) to its optimum power by regulating the MPPT IC input voltage (e.g., using an electronic circuit voltage regulator), which is the same as the output voltage of a solar cell (or a string of electrically connected solar cells), if and when needed, to a predetermined voltage based on the operating condition of the solar cells. Optimum solar cell (or a string of electrically connected solar cells) voltage is derived by periodically or intermittently measuring the solar cell (or a string of electrically connected solar cells) open circuit voltage ($V_{oc}$) and then regulating the solar cell (or a string of electrically connected solar cells) voltage to a voltage value corresponding to the product of this open circuit solar cell (or a string of electrically connected solar cells) voltage by a predetermined fixed constant (being between 0.60 and 0.90, and preferably between 0.7 and 0.85; such constant being preferably between 0.75 and 0.80 for crystalline silicon solar cells), if needed. The integrated circuit is preferably silicon based but may alternatively be made using other semiconductor materials such as silicon carbide.

Advantageously for reduced system impact (e.g., module material thermal impact of electronic components) and reduced system cost, among other advantages, the distributed MPPT power optimization solution may be packaged fully or partially as an integrated circuit (IC) and particularly as a low profile (i.e., low package thickness of less than 2 mm, preferably less than 1 mm or 0.6 mm) integrated circuit (e.g., having an operating temperature in the range of –40° C. to +105° C.) for embedding within solar PV module encapsulant materials (e.g., glass, polymeric, and laminate materials). The MPPT IC described in detail is designed to run with incoming solar irradiance as low as about one W/m² (1 watt per square meter) or more (light irradiance received at the solar cell or string of electrically connected solar cells). In other words, as long as the solar cell (or a string of electrically connected solar cells) is generating power with the slightest amount of light (e.g., sunlight) the MPPT IC will be powered up and continue to operate down to the level of about 1 W/m² (corresponding to ~$1/1000$ of standard test conditions or STC irradiance of 1 kW/m² for solar cell power generation). The exemplary distributed MPPT IC described is a 2.5 amp IC which may operate on and be powered by a supply voltage (solar cell or a string of connected solar cells input differential voltage range of positive voltage $V_P$ and negative voltage $V_M$) in the range of about 4.5V to 10.5V (this voltage range may be larger or smaller depending on the system requirements, for example less than 18 volts or in the range of 3 to 15 volts). Thus, the MPPT IC is directly powered by the source it is regulating (e.g., an individual solar cell or combination of solar cells connected in a string of solar cells connected to the MPPT IC input), eliminating the need for a separate power supply. The MPPT innovations described provide for, and the exemplary MPPT IC described, a single layer metal IC package for reduced cost and also reduced coefficient of thermal impact.

MPPT IC may have an efficiency as high as 99.5% or higher (or an insertion loss of less than about 0.5%) in the so-called pass-through mode of operation (pass-through mode is a non-switching mode of operation). The high-side and low-side field-effect transistor (FET) switches (M1 and M2) described provide low $R_{DSON}$ (on resistance between source and drain of FET) resulting in improved MPPT IC operational efficiency. The low-side field-effect transistor or FET (M2) advantageously has slightly more on resistance to make the high side FET (M1) more efficient (less ohmic losses), particularly with single layer metal circuits. The MPPT IC may advantageously have an analog-to-digital converter (ADC) based architecture for sample-and-hold (S&H) function to minimize power consumption and to support relatively long sample and hold times as needed. M1 may have an on-state drain-to-source resistance ($R_{DSON}$) of less than 50 milli-ohms for the pass-through mode of operation, and more advantageously an on-state drain-to-source resistance of less 25 milli-ohms for the pass-through mode of operation. M2 may have an on-state drain-to-source resistance ($R_{DSON}$) of less than 100 milli-ohms for the active bypass mode of operation, and more advantageously an on-state drain-to-source resistance of less 60 milli-ohms for the active bypass mode of operation. Additionally, the MPPT IC may have a center exposed metallic pad electrically connected to the negative input and negative output of the MPPT IC for heat sinking.

FIG. 1 is a diagram showing the connections and select functional elements and electrical terminals of a distributed maximum-power-point tracking (MPPT) power optimization solar photovoltaic system in accordance with the disclosed subject matter. Each solar cell (or a string of electrically connected solar cells 2, 4, to m) is electrically connected to an MPPT power optimizer of an MPPT integrated circuit (IC) package (MPPT package 6, 8, to n) and associated components (e.g., capacitors and rectifiers). Associated electrical components may include electrical connection wiring and electronic components such as capacitors, diodes and rectifiers such as Schottky barrier rectifiers (SBRs). The MPPT IC may be attached to a printed-circuit board, and also may be attached in combination with a capacitor $C_{IN}$ and Schottky barrier rectifier 26 to a printed-circuit board, such that the printed-circuit board provides positive and negative input and output leads. Solar cells (or strings of electrically connected solar cells) 2, 4, to m each power up a corresponding MPPT power optimizer having an MPPT integrated circuit (IC) package and associated components. Solar cells (or strings of electrically connected solar cells) 2, 4, to m may be a single solar cell or a combination of electrically connected solar cells forming a string of electrically connected solar cells (e.g., series connected string of solar cells or a hybrid series and parallel connected string of solar cells), for example, a solar cell or combination of electrically connected solar cells having an open circuit voltage, for instance, mostly in the range of 4.5-10V. Depending on the solar cell technology and the number of solar cells in a string of electrically connected solar cells (and the environmental shading and soiling conditions), the open-circuit voltage range of the solar cell or string of electrically connected solar cells may be a different voltage range, and the upper end of the voltage range may be as high as 24 V or even larger (and the lower end of the voltage range being as low as about 3 V). Current flow between solar cell(s) output and MPPT inputs may be in the range of 0 to 15 amperes and more often in the range of 0 to 4 amperes.

The positive and negative input leads of each MPPT power optimizer (e.g., leads shown as positive MPPT input lead $V_P$ 10 and negative MPPT input lead $V_M$ 12 of MPPT package 6) are electrically connected to the positive and negative leads of a corresponding solar cell or combination of electrically connected solar cells (e.g., leads shown as positive solar cell output lead 22 and negative solar cell output lead 24). The positive and negative output leads of each MPPT optimizer (e.g., positive MPPT output lead $V_{SW}$ 14 and negative MPPT output lead $V_M$ 16 of MPPT package 6) are electrically connected to the distributed MPPT power optimizers in the system (e.g., MPPT packages 8 to n and associated components). Thus, each solar cell, or combination of electrically connected solar cells, and its corresponding MPPT power optimizer form a circuit for substantially independent or autonomous power optimization and also electrical connections with additional solar cells and corresponding MPPT power optimizers (e.g., solar cell(s) and MPPT optimizer circuits as shown in FIG. 1), in a system comprising a plurality of MPPT power optimizers and a plurality of associated solar cells or strings of electrically connected solar cells. The resulting electrically connected solar cells and corresponding MPPT optimizers have a positive output lead and a negative output lead (e.g., positive system output lead 18 and negative system output lead 20) for electrical connections, for example to additional systems, modules, load, or the electrical grid through an inverter.

Capacitor $C_{IN}$ provides power stabilization and improves noise immunity, for example $C_{IN}$ capacitance value may be about 5 µF or higher for a 2.24 A load current and may advantageously be positioned as close to the MPPT package power supply and input positive connection pin $V_P$ as possible. $V_M$ is a power connection pin connecting to the solar cell (or string of electrically connected solar cells) negative voltage and $V_P$ is a power pin connecting to the solar cell negative voltage. $V_{SW}$ is a power switching output, SW is power switching connection output, Boost is a power boost connection, and $C_{BST}$ is a boost capacitor. $C_{BST}$ may connected across a positive output lead and a boost lead of the MPPT package and the boost lead may be connected to the gate drive boost input of the high side field effect transistor (M1). The value of the boost capacitor may also be about 5 µF. A Schottky barrier rectifier or SBR (e.g., Schottky barrier rectifier 26 in FIG. 1) provides a current path to bypass a solar cell (or a string of electrically connected solar cells), and corresponding MPPT power optimizer circuit. Schottky barrier rectifier 26 having its cathode attached to positive lead 14 and anode attached to negative lead 16. $C_{OUT}$ acts a filter for power inverter and may also be positioned in the Invertor package. Additional parasitic inductive filtering exists due to the wiring connected among various components. Additionally and if necessary, at least one inductor component may be placed in series within connections 18 and/or 20 to serve as filter in conjunction with the capacitor $C_{OUT}$. The MPPT package may also have additional electrical leads for MPPT package testing and evaluation.

Thus, the MPPT power optimizer having an MPPT IC package and associated components optimizes the power harvesting of a corresponding solar cell or combination of electrically connected solar cells (e.g., solar cell or string of electrically connected 2 in FIG. 1) substantially autonomously and fairly independent of other electrically connected solar cells—in other words, the MPPT power optimizer having an MPPT IC package and associated components may optimize the power harvesting of a corresponding solar cell (or a string of electrically connected solar cells) independent of the other cells (and the other MPPT power optimizers) in the same string of series-connected (or hybrid series and parallel connected) MPPT power optimizers.

Figure 5:
FIG. 5 is a power vs. voltage graph.

The MPPT power optimizer may work together with an online DC-to-AC power inverter (or a DC-to-DC power converter). A panel of solar cells is often made of a plurality (e.g., 60, 72, 96, 108, or another number) of solar cells, usually connected in electrical series. A DC-to-AC power inverter (known as inverter) connects to either one or a plurality of solar modules (with each module having a plurality of solar cells within the module laminate) and converts the solar photovoltaic (PV) system DC voltage and current to an AC line voltage and current, and sources the power to the load (such as electrical grid). The inverter may also provide a global (as opposed to distributed local) critical maximum-power-point tracking (MPPT) function for the entire solar system attached to and supported by the inverter. Using its MPPT function, the inverter loads the solar PV system such that the peak power (i.e., global maximum-power point) is reached and maintained at the system level. In other words, the inverter scans or walks up the system power vs voltage curve (see FIG. 5 showing a power vs voltage graph) in a power vs voltage function over a range of system voltages till the global maximum power is discovered and maintained.

For an individual solar cell, or a sub-panel combination of solar cells in a string of electrically connected solar cells (e.g., a combination of three to six solar cells in series string of a plurality of solar cells within a module laminate), a maximum-power-point tracking (MPPT) power optimizer must "pass" the solar cells energy to the panel string for the inverter to see this max power point. If all solar cells in the panel are operating normally (and approximately equal, such as when there is no localized shading or soiling), the MPPT power optimizer will stay in the so-called "pass-through" mode of operation. The solar panel operates best when all solar cells deliver the same photogeneration current in a string of series-connected solar cells. If for some reason (such as an external shading or soiling event) a solar cell (or a string of electrically connected solar cells) cannot support the required current, then that cell's output voltage will drop. If permitted to drop too low the cell (or cell string) and solar module will not operate at peak power. With the MPPT power optimizer forming a circuit with the cell (on the cell level), or forming a circuit with a sub-panel combination of solar cells electrically connected in a string, it measures the cells or sub-panel string combination of solar cells open circuit voltage, calculates a ratio or fixed multiplier of that voltage based on a predetermined constant (e.g., 0.76 times that voltage) and uses this point as the approximate MPPT point of the cell or sub-panel string combination of solar cells. The predetermined constant is selected to provide consistent power optimization and may a factor less than one and more often in the range of 0.70 to 0.85 and particularly often in the range of 0.75 to 0.85. Alternatively, the approximate MPPT point may be based on a fixed constant ratio or multiplier of the actual maximum power voltage ($V_{MP}$) of the solar cell(s). If the cell (or string of electrically connected solar cells) loaded voltage reaches this point, the MPPT power optimizer will start to regulate the input voltage of the cell to the MPPT point thus maximizing power harvesting (the optimizer operates in the "optimizer region" shown in FIG. 5).

Solar cells within the same module laminate (for instance, in a 60-cell or 72-cell or 96-cell solar module) may produce varying amounts of power (for instance, due to partial shading and soiling events as well as manufacturing variation). Thus, a purpose of the MPPT power optimizer is to handle cases where a solar cell (or multiple solar cells electrically connected in a string) cannot support the current sourced through electrically connected solar cell system (e.g., a module or panel), such as in the case of a solar cell (or string of electrically connected solar cells) being shaded. Without the MPPT power optimizer, when a solar cell (or string of electrically connected solar cells) is shaded, the whole system (e.g., the whole solar module or panel) must reduce its current to accommodate the shaded cell or the shaded string of connected solar cells within the module laminate, resulting in loss of power in the whole system (e.g., module or panel and subsequently the PV system comprising a plurality of PV modules). The distributed MPPT power optimizer keeps the whole system (e.g., module or panel) running at or near its peak power point by utilizing multiple modes of operation for maximum power harvest and operational efficiency (minimum dissipation losses).

Additionally, the power production of a particular solar cell (or a string of electrically connected solar cells) may vary significantly. This variance may be due to the amount of light received, for example shading in addition to irradiance variations from sunrise till sunset, temperature, solar cell structural failures, or a number of other solar cell external and internal factors. A stronger solar cell produces higher power and a weaker solar cell generates lower power. The multiple modes of operation of the MPPT power optimizer provide increased power harvesting and efficiency from the optimized solar cell or combination of solar cells (or string of electrically connected solar cells). Besides the switching optimization mode of operation, the MPPT power optimizer provided herein may have an active bypass mode of operation, and a pass-through mode of operation. The MPPT power optimizer may further have a sleep (shutdown) mode and a passive bypass mode utilizing a rectifier such as a Schottky barrier rectifier (SBR).

Figure 2:
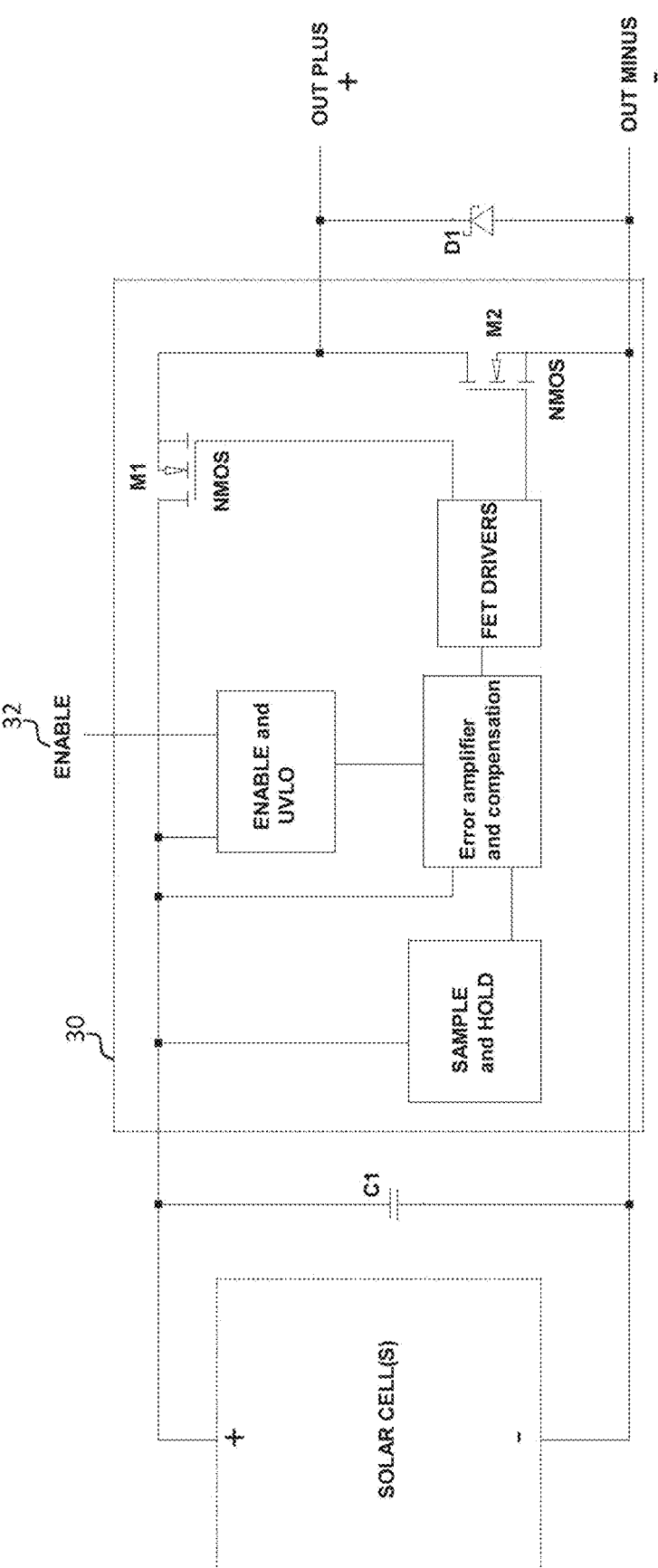
FIG. 2 is a functional block diagram of an exemplary multi-modal MPPT power optimizer.

FIG. 2 is a functional block diagram of an exemplary multi-modal MPPT power optimizer. Solar cell (or a string of electrically connected solar cells) is electrically connected to integrated circuit MPPT IC 30 through positive and negative leads on the solar cell (or string of electrically connected solar cells) and MPPT IC. MPPT IC negative input lead and positive input lead may be connected together to form a common lead in the MPPT IC. Similar to capacitor $C_{IN}$ shown in FIG. 1, C1 is a capacitor for power stabilization and noise immunity improvement. And similar to Schottky barrier rectifier 26 shown in FIG. 1, D1 Schottky barrier rectifier (also called a Schottky diode or SBR) provides a current path to bypass the solar cell (or string of electrically connected solar cells) and corresponding MPPT IC 30.

SAMPLE and HOLD (S&H) is a circuit that measures the open-circuit voltage $V_{oc}$ of the solar cell (or string of electrically connected solar cells). This circuit measures the voltage and calculates a ratio or multiplier of this value (e.g., a factor 0.76 multiplied by the measured open-circuit voltage, as described herein) as the corresponding maximum power point set-point for the solar cell (or string of electrically connected solar cells). The multiplier constant may be a value in the range of 0.60 and 0.90, preferably a constant in the range of 0.70 to 0.85 (e.g., 0.76 as mentioned previously). The maximum power point set-point is then digitized (using the ADC) and stored for the other functional blocks to use. Advantageously, SAMPLE and HOLD (S&H) may be a timing circuit having an analog-to-digital converter (ADC) based architecture to minimize MPPT IC power consumption and support longer sample and hold times (e.g., sample and hold times on the order of seconds to minutes). In the case of an ADC based architecture, an analog-to-digital converter (ADC) stores the number and a digital-to analog-converter (DAC) sends the stored value to the error amplifier and compensation. Generally, the sample and hold circuit may use periodic open circuit voltage sampling pulses for periodic measurements of open circuit voltage at a specified sampling period, sampling frequency, and sampling pulse duration for each sampling pulse. The sampling period may be in the range of seconds (e.g., in the range of 1 to 100 seconds and more preferably from in the range of 2 to 20 seconds). The sampling frequency may be in the range of 0.01 hertz to more than one hertz and more preferably in the range of 0.05 hertz to 0.5 hertz. The sampling pulse duration may be in the range of less than 100 micro-seconds up to 10 milli-seconds, more particularly in the range of 100 micro-seconds up to 1 milli-seconds, and advantageously in the range of 300 micro-seconds up to 800 micro-seconds.

Error amplifier and compensation compares the voltage of the solar cell (or string of electrically connected solar cells) to the maximum power point setpoint from the SAMPLE and HOLD circuit. If the solar cell (or string of electrically connected solar cells) voltage is above the SAMPLE and HOLD maximum power point set-point, then M1 is turned on and M2 is turned off If the solar cell (or string of electrically connected solar cells) voltage is below the maximum power point set point then M1 is turned off and M2 is turned on. In this mode, M1 and M2 will continue to switch back and forth in a controlled frequency (e.g., a 500 kHz frequency) and a controlled duty cycle (greater than 0% and less than 100%), thus maintaining the solar cell(s) voltage at or close to its maximum power point.

The FET DRIVERS circuit provides the necessary power to switch M1 and M2 FET (Field Effect Transistor) gates on and off M1 may be an n-channel field-effect transistor (NMOS). M1 may require a voltage above the solar cell (or string of electrically connected solar cells) voltage rail. An internal charge pump and low impedance switch may be used for this case. M2 may be an n-channel field-effect transistor (NMOS). M2 may require a simpler low impedance driver from minus to solar cell (or string of electrically connected solar cells) voltage to work. FET Drivers also have internal current sensing which turns off the gate drive in the event of an over-current condition.

ENABLE and UVLO is an enabling and under voltage lockout circuit. Enable is a signal which can turn on and off the MPPT IC functionality. Under Voltage Lock Out (UVLO) monitors the solar cell (or string of electrically connected solar cells) voltage, and if the voltage is too low for the MPPT IC to safely operate, the MPPT IC is disabled until the solar cell (or string of electrically connected solar cells) voltage is high enough to safely operate the MPPT IC (e.g., when solar cell or string of electrically connected solar cells power generation is restored to normal operating conditions). Enable 32 is an input pin so it is shown external to the IC.

M1 NMOS and M2 NMOS are power field effect transistors (FET), for example MOSFET switches, used to switch the power from the solar cell (or string of electrically connected solar cells) to the corresponding solar module. M1 NMOS is a high-side Pass field-effect transistor (FET) that delivers power and M2 NMOS is a low-side Synchronous (Sync) field-effect transistor (FET) with lower power loss than a diode (e.g., Schottky barrier rectifiers 26 in FIG. 1 and D1 in FIG. 2). FET DRIVERS are field effect transistor gate drivers for M1 NMOS and M2 NMOS. While MOSFET is advantageous for low power consumption, MESFET, high-electron mobility transistors, and bipolar junction transistors may also be used as switches.

To maximize power harvest and minimize power losses (e.g., minimize MPPT IC insertion loss), the multi-modal maximum-power-point tracking (MPPT) power optimizer operates in multiple operating modes. The multi-modal maximum-power-point tracking (MPPT) optimizer has functional operating modes (also called states) of active bypass mode, switching MPPT optimization mode, and pass-through mode dependent on the power (measured by voltage) generated by a connected solar cell (or string of electrically connected solar cells) as well as a desired maximum power point set-point based on ratio (or fixed constant multiplier) of the open circuit voltage of the connected solar cell (or string of electrically connected solar cells). The operating modes may provide a pass-through or bypass circuit or may adjust the input voltage conditions of the multi-modal maximum-power-point tracking (MPPT) power optimizer (e.g., by loading the circuit) based on the output voltage of the solar cell (or string of electrically connected solar cells) in order to generate maximum power based on the IV curve (i.e., current vs. voltage curve) for that solar cell or combination of electrically connected solar cells. In other words, the adjustable switching duty cycle of a switching DC-to-DC power converter (e.g., operating at a specified switching oscillator frequency) may be adjusted (between 0% and 100% duty cycle) such that solar cell or combination of electrically connected solar cells receives a load impedance that corresponds to its maximum power point bias point (or a bias point sufficiently near its maximum power point). The specified switching oscillator frequency may be in the range of 100 kilo-hertz to 5 mega-hertz, more particularly in the range of 100 kilo-hertz to 5 mega-hertz, and advantageously in the range of 300 kilo-hertz to 700 kilo-hertz. A shut-down mode (also called sleep-mode) and passive bypass mode further enhance automated functionality, power harvesting, and efficiency. In the shut-down mode, the MPPT IC is does not perform any function and sleeps (powered down, for instance, at night when the solar cells do not generate any power). The passive bypass mode (using SBR) provides a complete bypassing of the MPPT and its associated solar cell (or string of electrically connected solar cells) when there is a failure of the MPPT chip and or its associated solar cell (or string of electrically connected solar cells), hence, preserving system-level functionality for the overall solar PV system.

Threshold/transition voltage guidelines described for the MPPT optimization operating modes may be different for different solar cells or combinations of solar cells as well as different MPPT optimization components (e.g., depending on solar cell technology, number of solar cells in a string of electrically connected solar cells, and solar system characteristics). Parasitic inductance of the wiring connecting the solar cell(s) is used to filter and average current and voltage (i.e., filter the current and voltage) and also control peak current, hence, eliminating the need for dedicated inductor components for each MPPT IC. This innovation, in combination with high frequency use, allows for reduced insertion loss (and reduced cost and enhanced reliability) and substantially reduced optimizer size as an inductor component for filtering and current averaging is avoided by instead relying on the wiring elements required for electrical connections among solar cells and MPPT ICs. Delayed optimizing mode transition may increase the stability of system-level MPPT by filtering out sub-optima power point maxima.

Figure 3:
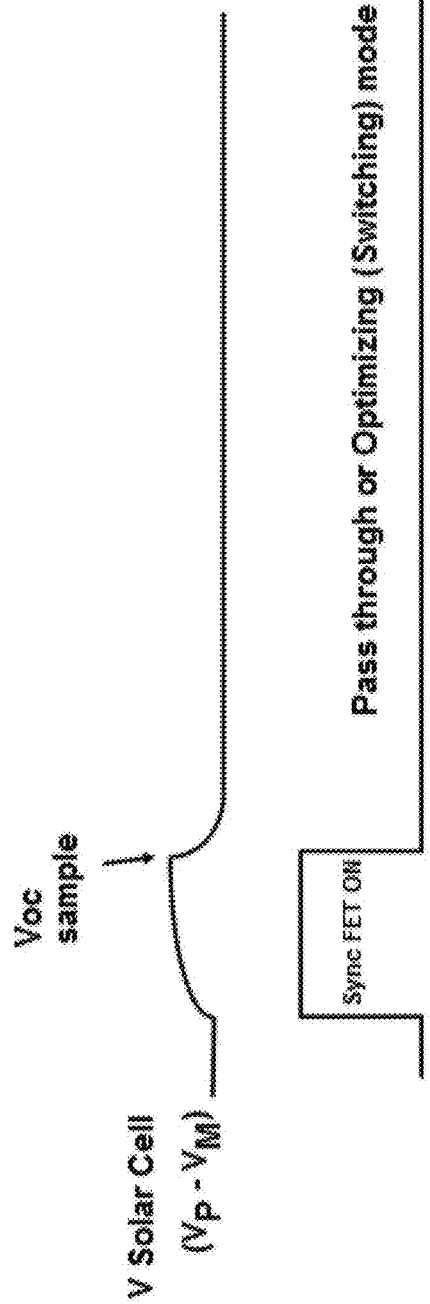
FIG. 3 shows a representative timing diagram for a sample and hold (S&H) circuit.

FIG. 3 shows a representative timing diagram for a sample and hold (S&H) circuit to illustrate MPPT optimizer timing. During operation, the timing circuit samples the solar cell (or string of electrically connected solar cells) open circuit voltage ($V_{oc}$). Solar cell $V_{oc}$ sampling is critical for operation when the high-side FET (M1) is turned off and is part of $V_{oc}$ discovery. The $V_{oc}$ sampling may be queried about every second (the sampling period may be longer, for instance, one measurement up to every 30 seconds, or shorter, for instance, one measurement down to every 100 milliseconds) as the solar cell open circuit voltage ($V_{oc}$) may vary quickly (e.g., due to intermittent shading events or ambient temperature changes).

$V_{oc}$ sampling occurs by turning off the Pass nFET (high-side nFET M1) and turning on the Sync nFET (low-side nFET M2). This accomplishes two results: first it unloads the solar cell (or string of electrically connected solar cells) and puts it in open-circuit condition, and second it shorts the output so the solar panel current may keep flowing without disruption. While the Pass nFET (high-side nFET M1) is off, the circuit must wait for the $C_{IN}$ capacitor to charge up to $V_{oc}$. For example, using a 4.7 µF capacitor, plus considerable solar cell distributed capacitance, and for a 2.27 amp solar cell, the $C_{IN}$ may take approximately 250 µSec to charge up to $V_{oc}$. Advantageously, the circuit may permit 320 µS of charge wait time to enable any solar cell power generation condition (e.g., a very weak cell having a 0.2 A capability would still meet the timing requirement). After the $V_{oc}$ is measured the Sync FET is turned off and the Pass FET is turned on and normal operation is restored.

When the solar cell (or string of electrically connected solar cells) voltage (solar cell positive and negative voltage differential $V_P-V_M$) is greater than a desired threshold, for example $V_P-V_M$ in the range 5V to 10.5V Rising (e.g., in an increasing power generation solar cell condition such as sunrise) and 4.75V to 10.5V Falling (e.g., in a decreasing power generation solar cell condition such as sunset)), and $V_P-V_M$ is greater than a desired ratio (or fixed constant multiplier of less than 1) of its open circuit voltage $V_{oc}$, for example 0.76 of the $V_{oc}$, then the MPPT power optimizer operates in pass-through mode. When the solar cell (or string of electrically connected solar cells) voltage ($V_P-V_M$) is greater than a desired threshold, for example $V_P-V_M$ in the range 5V to 10.5V Rising (increasing such as in the case of sunrise) and 4.75V to 10.5V Falling (decreasing such as in the case of sunset), and $V_P-V_M$ is less than a desired ratio (or fixed constant multiplier of less than 1) of its open circuit voltage $V_{oc}$, for example 0.76 of the $V_{oc}$, then the MPPT optimizer operates in the switching optimizing mode.

With reference to FIGS. 1 and 2, the input capacitor ($C_{IN}$ in FIG. 1 and C1 in FIG. 2) advantageously may have a value greater than or equal ~4.7 µF. The boost capacitor (CBsT in FIG. 1) advantageously may have a value greater than or equal to ~4.7 µF. For the Under Voltage Lockout UVLO (ENABLE and UVLO in FIG. 2), the reference and the circuit remain reset until the ($V_P-V_M$) crosses UVLO threshold.

Ideally the MPPT IC will primarily operate in pass-through mode during the daytime (pass-through mode operating when solar cells, or a combination of solar cells, are strong and there is no shading) and will primarily operate in shutdown mode during the nighttime (when there is no power generation by the solar cells). Operating modes optimizing mode (also called switching mode or switching optimization mode or switching optimizing mode), active bypass mode, and passive bypass mode provide increased power harvesting and improved operational reliability during a wide range of power generation conditions and can also serve as transition modes between pass-through mode and shut-down mode. Other key benefits of these transitional modes include improved system level and MPPT IC power efficiency, reliability, and overall fault tolerance.

Pass-through mode is the operating mode when the solar cell, or combination of solar cells in an electrically connected string, is generating voltage both over a certain threshold (and up to a maximum allowed solar cell voltage) and over a set a ratio of the open circuit voltage ($V_{oc}$) of the solar cell. Thus, in a solar PV system as provided, pass-through mode operates when the current of the solar cell, or combination of solar cells in a string, is in the same range as the system (e.g., module or panel) current. Current matching throughout the system may be indicative of an absence of localized shading.

With reference to FIG. 2, in pass-through mode the High side FET M1 is turned ON and the Low side FET M2 is turned OFF. Thus, pass-through mode permits the module current to fully pass through M1 and the solar cell. In pass-through mode the High Side nLDMOS (e.g., M1 in FIG. 2) is on 100% of the time between $V_{oc}$ sampling pulses (e.g., with sampling frequency of one sample every two to twenty seconds, or over a wider range of one sample every 0.1 to 60 seconds). A Pass-Through efficiency of 99.5% may be achieved by a High Side nLDMOS with Rds-on=16 mOhm at Standard Test Condition temperature 25° C. This relatively low on-state source-drain resistance for the high-side FET M1 ensures sufficiently low ohmic losses during the pass-through and switching modes of operation.

Exemplary pass-through mode operating thresholds include when the solar cell voltage ($V_P-V_M$) is in the range 5.0V to 10.5V Rising (e.g., in an increasing power generation solar cell condition such as sunrise) and 4.75V to 10.5V Falling (e.g., in a decreasing power generation solar cell condition such as sunset) and is above 0.76 of the $V_{oc}$ (i.e., open circuit voltage multiplied by 0.76).

The MPPT power optimizer has 100% duty cycle operation in pass-through mode (i.e., no switching optimization during the pass-through mode of operation). As the input voltage approaches the output voltage, the converter turns the high side N-channel transistor (high side nFET M1, also referred to as Pass FET) continuously. In this mode the output voltage ($V_{OUT}$) is equal to the input voltage minus the voltage drop across the N-channel transistor: $V_{OUT}=(V_P-V_M)-I_{LOAD}(R_{DSON}+R_L)$; where ($V_P-V_M$) is solar cell voltage, $R_{DSON}$ is N-channel high side (high side nFET M1, also referred to as Pass FET) switch ON resistance, $I_{LOAD}$ is output current, and $R_L$ is inductor (or wiring) DC resistance.

Optimizing (or Switching) mode is the operating mode when the solar cell, or combination of solar cells connected in a string supported by an MPPT IC, is generating voltage both over a certain threshold (and up to a maximum allowed solar cell voltage) and below a set a ratio (or fixed constant multiplier) of the open circuit voltage ($V_{oc}$) of the solar cell. This may occur when the solar cell, or combination of solar cells in an connected string, are weaker as compared to other cells in the panel (e.g., lower efficiency due to manufacturing variation) or there is mild to heavy shading or variable shading (optimizing mode operates in a larger range of shading conditions). The weak or shaded solar cell, or combination of solar cells in a connected string, cannot deliver the current of other panel cells which pulls down voltage on the weak or shaded solar cell, and once the voltage reaches a certain ratio of $V_{oc}$ the MPPT IC transitions operating modes from pass-through mode to optimizing mode.

Advantageously, transitioning out of optimizing mode may be somewhat delayed (e.g., for about twenty to thirty milliseconds). This delay may benefit an overall solar PV system inverter global MPPT as it adjusts its power points and may allow an overall system to have a single power point (mono-maximal power point) without a need for sub-optima maxima power points. By filtering out sub-optima maxima, a more stable maximum power is provided which is more readily discoverable to string and central inverters with built-in MPPT functions.

During pass-through mode, the MPPT IC performs an open circuit sample ($V_{oc}$). $V_{oc}$ sampling is performed by turning off the high side FET M1 and thus turning off the current from the solar cell creating an open circuit. The solar cell (or string of electrically connected solar cells) voltage will rise and a voltage sample is taken and stored. M1 turns back on and the solar cell (or string of electrically connected solar cells) is again loaded and its voltage drops. If the voltage drops below a predetermined level of $V_{oc}$ (e.g., below 0.76 multiplied by the measured $V_{oc}$), then the switching optimization mode starts. M1 will be turned on and off (e.g., at a frequency of ~500 kHz) in a controlled pulse width modulated condition that keeps the cell voltage at the predetermined $V_{oc}$ (e.g., 0.76 multiplied by $V_{oc}$). This maintains the cell voltage at its peak operating point (maximum power point known as MPP). M2 does the opposite of M1 and turns on when M1 turns off This permits the solar module current to pass unimpeded through the module while M1 is off Thus, in optimizing mode the power delivered by the solar cell (or string of electrically connected solar cells) is the maximum available although reduced due to shading or perhaps due to a weak solar cell.

Exemplary optimizing mode operating thresholds include when the solar cell voltage ($V_P$–$V_M$) is in the range 5.0V to 10.5V Rising (e.g., in an increasing power generation solar cell condition such as sunrise) and 4.75V to 10.5V Falling (e.g., in a decreasing power generation solar cell condition such as sunset) and is less than 0.76 multiplied by $V_{oc}$ (solar cell or string of connected solar cells open circuit voltage). The max voltage value 10.SV indicating a maximum voltage the solar cell(s) may generate or a maximum voltage the MPPT IC and components may support.

Active bypass mode is the operating mode when more than about one watt/m$^2$ of irradiance power is received by the solar cell or combination of solar cells but the solar cell or combination of solar cells may be heavily shaded with respect to the rest of the solar module. Active bypass mode provides for a smooth low-loss turn on/off transition to reduce electromagnetic/radio frequency interference and electromagnetic emission. Additionally, active bypass mode may act as a fail-safe due to higher temperatures (e.g., 110° C. such as in the case of a fire) to turn the system off more smoothly. The voltage threshold for active bypass mode may be set as the UVLO threshold for the MPPT IC on the low end and a minimal threshold to contribute power (or not be a power drain) to electrically connected solar cells on the high end, assuming these electrically connected solar cells are operating under minimal ideal conditions. In this solar cell power generation condition the solar cell, or combination of solar cells, does not have any power to deliver but there is enough voltage to activate the MPPT IC (i.e. a heavily shaded cell). In active bypass mode, the solar cell, or combination of solar cells, does not deliver any power to the panel and nor does it cause appreciable power loss by using a bypass circuit (e.g., super barrier rectifier)—in other words the cell does not deliver power but it does not lose power as there is much less heat dissipation and insertion loss. The high end value in the active bypass mode voltage range may be determined as a sufficiently low voltage such that in active bypass mode power harvesting is not compromised or lost. In heavily shaded conditions the photogenerated current and maximum power capabilities may drop by orders of magnitude. Such a solar cell power generation condition would occur when a solar cell or string of solar cells in a module is very heavily shaded such that it cannot generate appreciable power or current and cannot keep up with the unshaded solar cells and strings in the module—thus the shaded solar cells or string of solar cells is bypassed. Active bypass mode provides a lower loss bypass mode than a bypass circuit (e.g., a bypass circuit using an SBR). The high end value in the active bypass mode voltage range may be based on modeling of the $V_{oc}$ of a solar cell or string of solar cells under heavily shaded conditions at a high operating temperature (e.g., 65° C.).

As an illustrative example, alternatively in a heavily shaded low power generation condition without an active bypass mode the bypass circuit (e.g., Schottky barrier rectifier) would be forward biased resulting in a loss of approximately 0.6V times the module current (e.g., 0.6×4 A=2.4 W lost). However, in active bypass mode M1 is turned OFF and M2 turned ON thus shorting the output and bypassing the current with only a small loss of power (e.g., if M2 is a 34 mOhm resistance FET, the loss would be approximately $4^2$×0.034=0.54 W resulting in savings of almost 2 W as compared to the 2.4 W loss in the illustrative example above). When the MPPT IC is in active bypass mode, the High Side nLDMOS is OFF and the Low Side nLDMOS is ON 100% of the time. Thus, active bypass mode may act as an intermediate stage which turns on at low power and reduces the loss associated with a bypass circuit (e.g., SBR) because it turns on the gate of the low side nLDMOS, resulting in increased efficiency. The active bypass mode operating thresholds may be used to set the minimum threshold value for pass-through mode and optimizing mode and the maximum threshold value for passive bypass mode. Exemplary active bypass mode operating thresholds include when the solar cell (or string of electrically connected solar cells) voltage ($V_P$–$V_M$) is in the range 4.5V to 5.0V rising (increasing such as during sunrise) and 4.75V to 4.25V falling (decreasing such as during sunset).

Passive bypass mode is the operating mode when about less than one watt/m$^2$ of power is generated by the solar cell or combination of solar cells, such as in the case of severe shading (e.g., 1000× shading or $\frac{1}{1000}$ of maximum sunlight), and the MPPT IC cannot operate. Moreover, this passive bypass mode provides fault tolerance and allows for the module current to bypass the MPPT IC and its associated solar cell (or string of electrically connected solar cells), if and when there is a failure of the MPPT IC and/or its associated solar cell (or string of electrically connected solar cells), hence, providing continued system-level functionality even in case of a component failure. In this state the MPPT IC shuts down, turning off both M1 and M2, and the module/system current will then be forced to flow through the bypass circuit (shown as a Schottky barrier rectifier 26 in FIG. 1) thus forward biasing the bypass circuit. Although these instances may be considered rare, passive bypass mode is used to minimize losses across the entire system (e.g., module or panel) by preventing the entire system from not generating power. Additionally, the passive bypass mode provides a controlled turning off and on of the MPPT IC resulting in a more reliable MPPT IC. Again as discussed, the passive bypass mode also provides an additional fault tolerance mode in the case of any MPPT IC failure event (e.g., the integrated circuit itself or its electrical connections) as the bypass circuit (e.g., Schottky barrier rectifier) takes over and allows overall solar module to function except for the failed sub-block. The bypass circuit may utilize a diode component such as Schottky barrier rectifier (SBR) or a PN junction diode. In passive bypass mode, a bypass circuit is on (e.g., a diode such as super barrier rectifier Schottky barrier diode: SBR) is on and the High Side nLDMOS (M1) and Low Side nLDMOS (M2) are both off Exemplary passive bypass mode operating thresholds include when the solar cell voltage ($V_P$–$V_M$) is in the range 0.0V to 4.5V rising (increasing such as during sunrise) and 4.25V to 0V falling (decreasing such as during sunset) and $V_{SW}-V_M<-0.8V$.

Shutdown mode (also called sleep mode) is the operating mode when the solar cell or combination of solar cells in a string is not generating any appreciable voltage and power, for example at night or when completely shaded. In other words, shutdown mode operates when there is not enough power to power the MPPT IC (e.g., the UVLO threshold is not met such as when $V_P-V_M$ is less than one volt) and the MPPT IC is off Exemplary shutdown mode operating thresholds include when $V_P-V_M=0V$ and $V_{SW}-V_M>-0.7V$.

Figure 4:
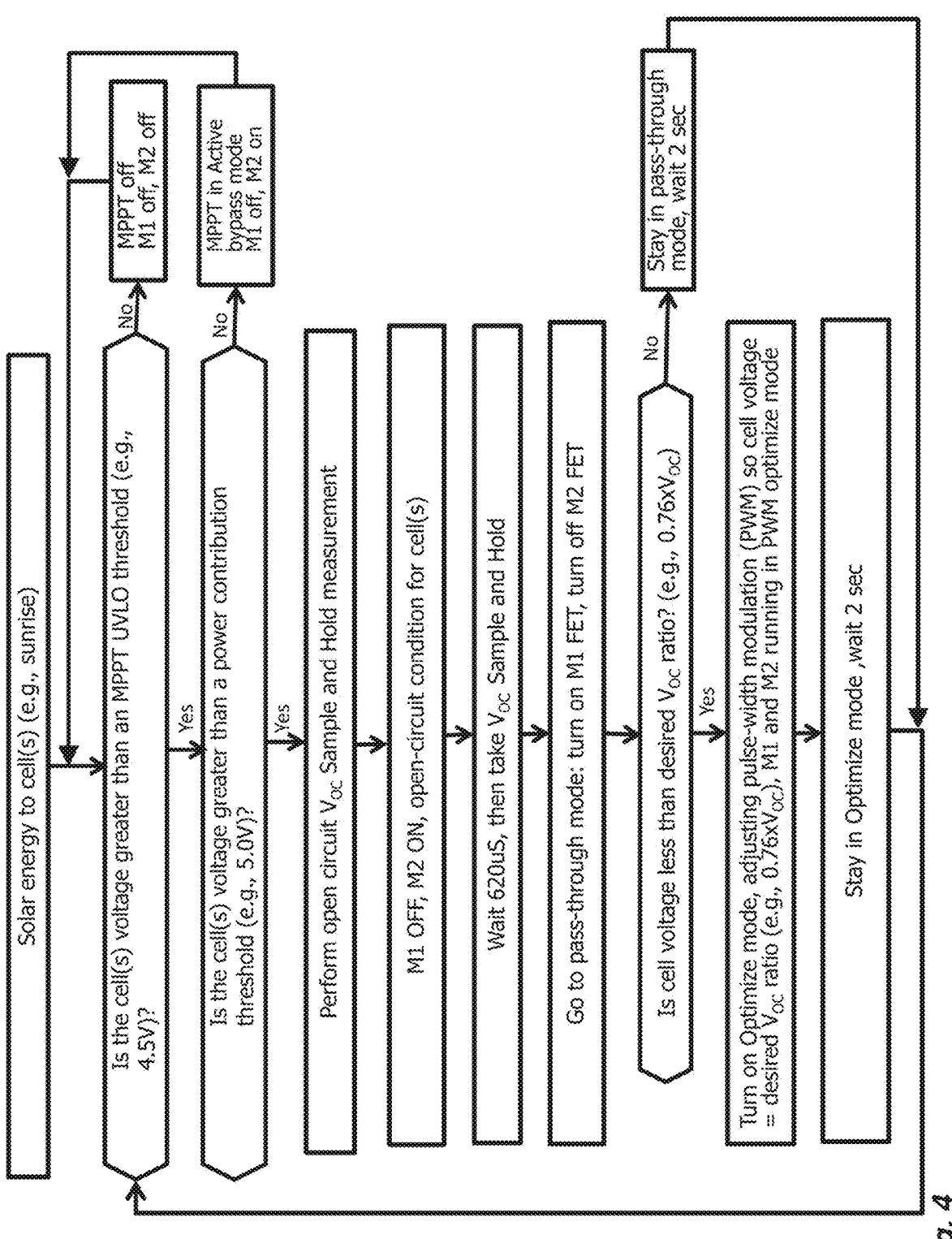
FIG. 4 is a flow chart of multi-modal MPPT operation.

FIG. 4 is a flow chart of multi-modal MPPT operation based on the exemplary operating mode threshold voltages provided.

FIG. 5 is a power vs. voltage graph showing optimizer mode and pass-through voltage operating conditions.

Figure 6A:
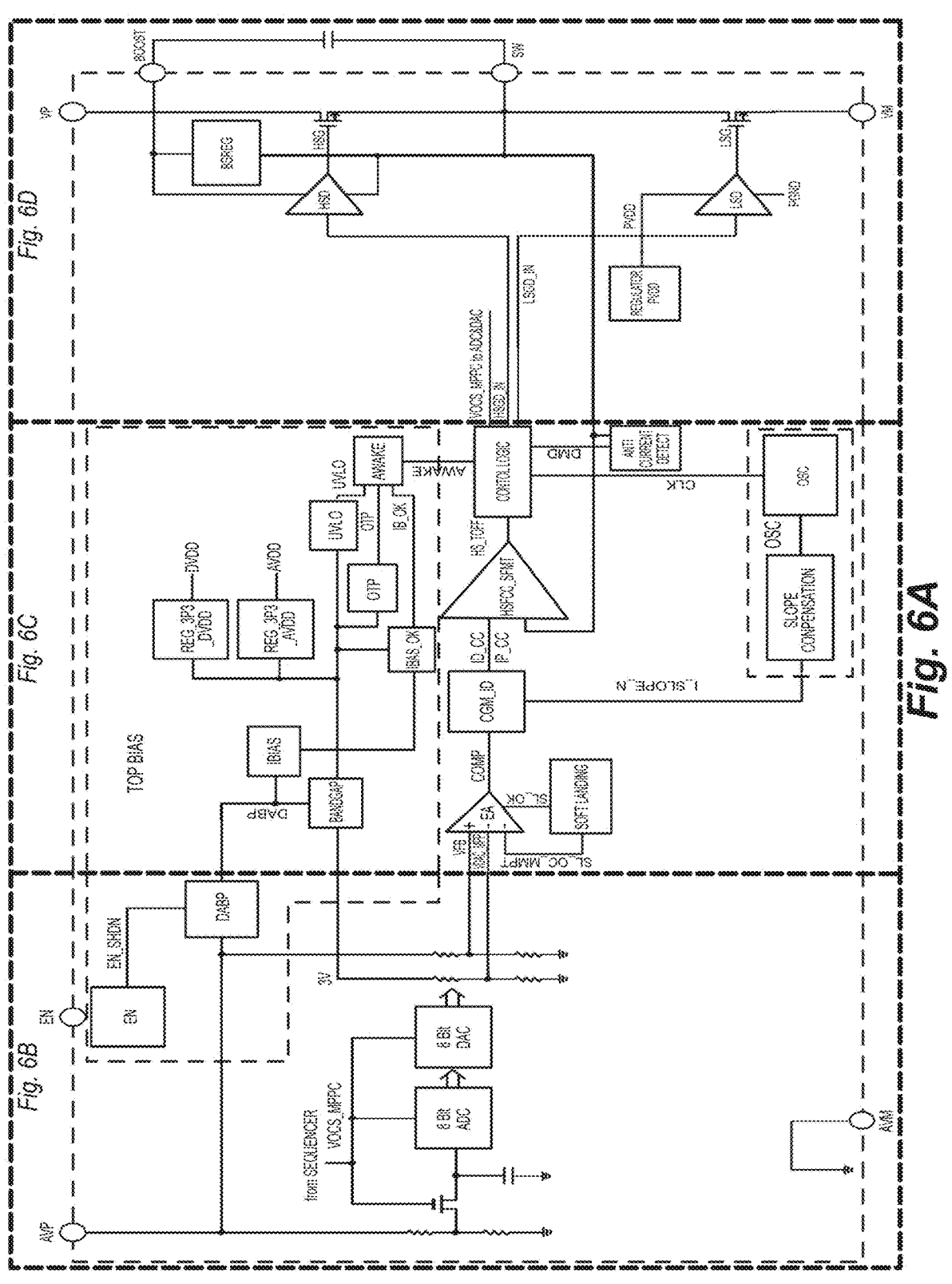
FIG. 6A is a functional block diagram and FIGS. 6B and 6C and 6D are expanded views of FIG. 6A.

FIG. 6A is a more detailed functional block diagram of that shown in FIG. 2. For example, HSG of FIG. 6A is M1 of FIG. 2 and LSG of FIG. 6A is M2 of FIG. 2. For example, additional detailed electronic circuit functionality and components include vdd, ibias and bandgap. As identified in FIG. 6A, FIGS. 6B and 6C and 6D are expanded views of FIG. 6A.

Figure 6B:
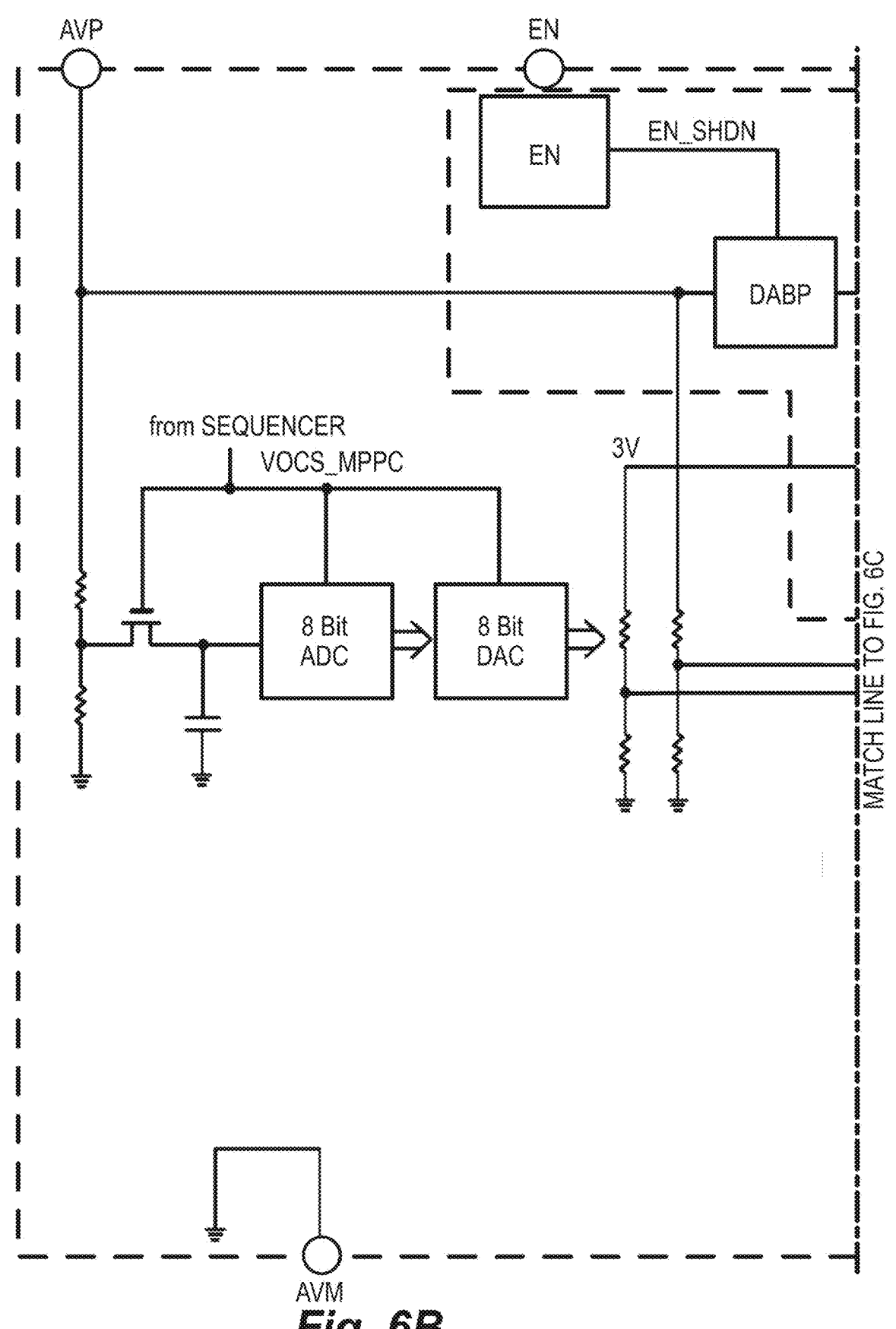

Among other components, expanded view FIG. 6B shows the sample and hold and the enable circuit. The solar cell voltage is resistor divided down, a sample of this voltage is taken and digitally stored with an ADC. A DAC is used to restore the digital value to an analog voltage for a reference in and error amplifier stage. The Enable signal turns on and off all the Vdds and current biases.

Figure 6C:
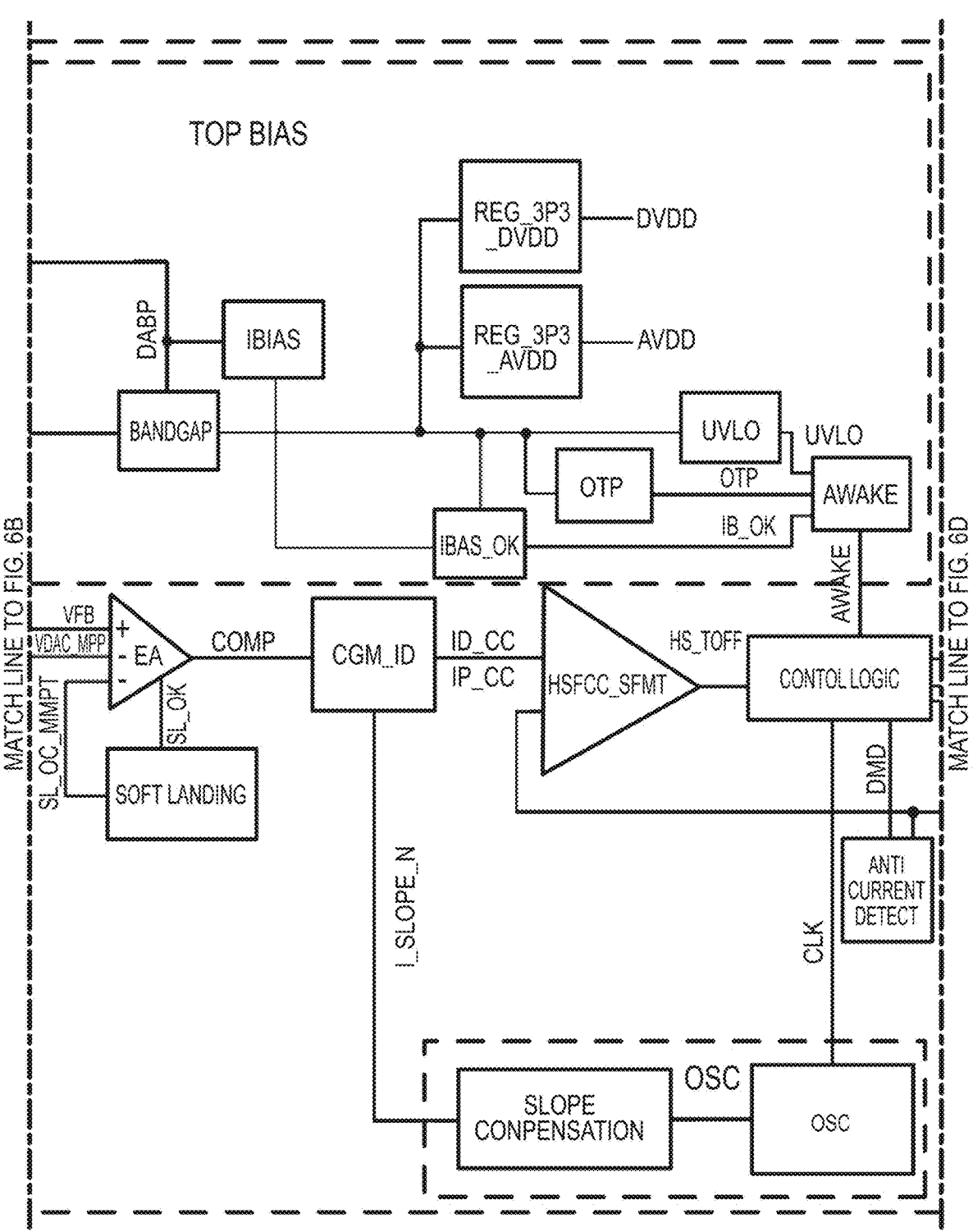

Among other components, expanded view FIG. 6C shows the Error amplifier, ramp generator, clock, control logic, and all the voltage and current biases. The error amplifier compares the reference voltage for the DAC to the voltage of the solar cell. The error amplifier in combination with the control logic decides which mode the power FETs should be in. If the solar cell voltage is too high the High side FET will turn on, if the voltage is too low the low side FET will turn on. If the solar cell voltage is in the range when a PWM pulse is needed to regulate the solar cell at Max power point, then the PWM circuit will turn on and start regulating.

Figure 6D:
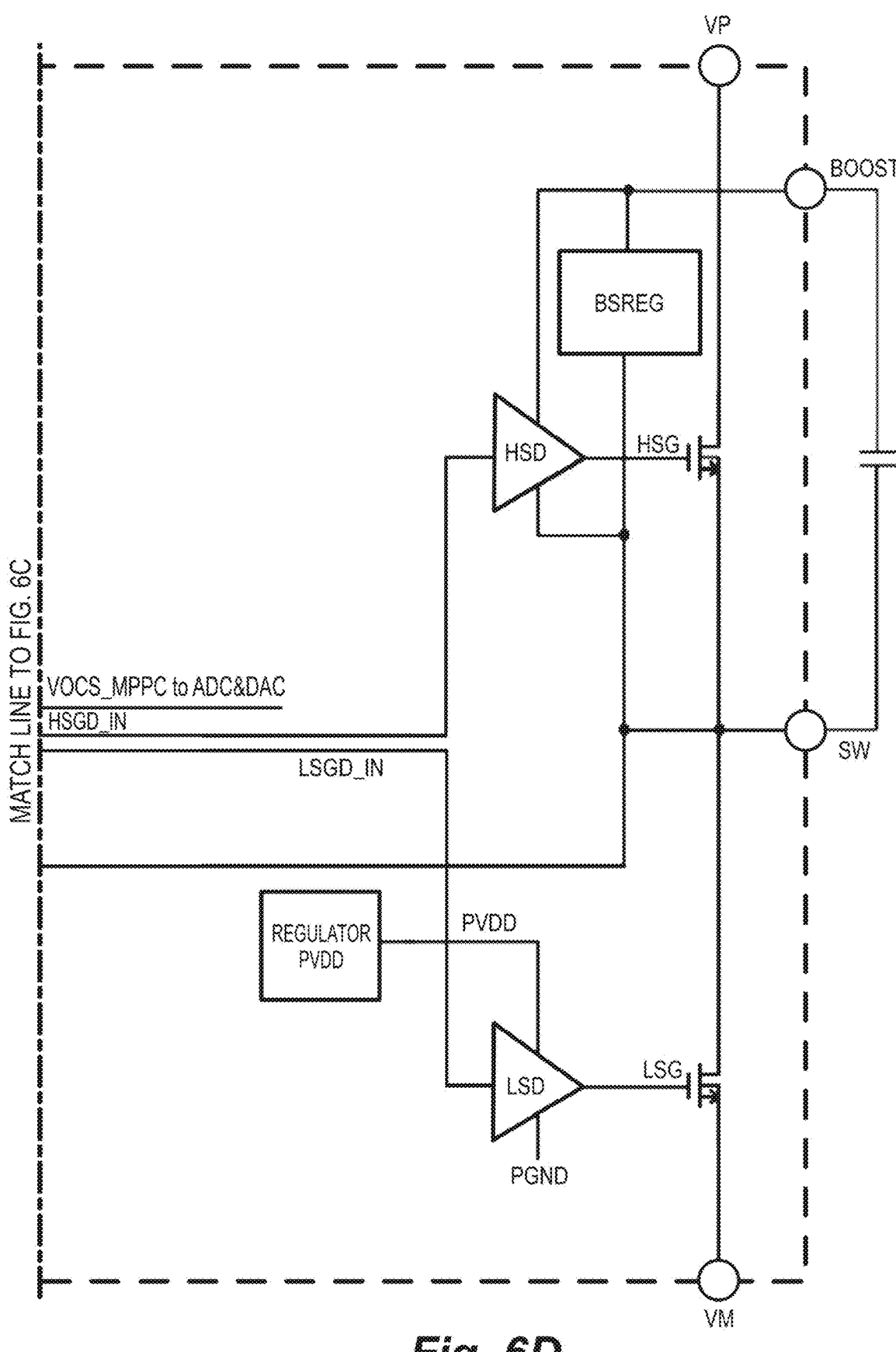

Among other components, expanded view FIG. 6D the two power FETs, the FET drivers, and current limiting. The purpose of the FET drivers is to supply the required current into the gates of the FETs so they can switch on and off at the required speed. The high side FET also may require a voltage higher than the cell voltage so a charge pump is implemented to accomplish this. In the event of an over current, and to protect the FETs from over current a sense circuit is used which will turn of the FETs. This is a cycle by cycle current limit.

With reference to the functional block diagram of FIG. 6A and the expanded views of FIG. 6A shown in FIGS. 6B, 6C, and 6D:

En: Enable Optimizer manages power-up and power down 8 bit ADC: 8 Bit Analog to Digital converter which is used to digitize and store the open 0.076 of the PV panel Open Circuit Voltage 8 bit DAC: 8 Bit Digital to Analog Converter is used to set the target voltage VDAC_MPP for the error amplifier and achieve 0.76 of VOC EA: Error amplifier is used to provide amplification and feedback and stability for peak current mode controlled Solar power DC to DC Converter Soft Landing: Softlanding is used to implement a smooth transition from Open Circuit sampling to optimizing (Switching) Mode or pass through mode CGM_ID: Implements the CGM_ID parameter in the peak Current mode control equation and provides a stable operating region in Optimizing (Switching) Mode Slope Compensation: Slope Compensation avoids wide pulse narrow pulse current loop instability and suppress the impact of the Interference and noise in the system HSFCC_SFMT: High Side Current Comparator "Start-Up Minimum T-On" implemented the cycle by cycle current comparator to turn off High Side nFET when the peak command current is exceeded Control Logic: The Control Logic ensures that the High Side Gate Driver (HSD) and Low Side Driver (LSD) are off during power up, power down, Over temperature over current conditions. It also ensures that the HSD and LSD are never on at the same time BSREF: Boost Regulator is used to pride power for the High side nFET Transistor Anti_Current: Anti Current is used to prevent power loss and destruction due to reverse current flowing into the Solar PV panel Osc: The Oscillator is used to provide a clock for the system DAPB: Dark Active Bypass is used to implement the active bypass when the solar irradiance is very low and the VOC is less than 4.75V approximately, for example Bandgap: The Bandgap Voltage reference is turned on when the power supply is above approximately 3.75V, for example, and is used to provide voltage references and Bias current references that are accurate and stable over temperature and semiconductor process corners UVLO: The Under Voltage Lock-out is used to ensure the solar optimizer does not destroy itself during power up and power down OTP: Over Temperature protection is used to turn of the Optimizer when the Temperature of the die is above ~135° F.

Awake: The Awake signal is a critical signal that enables the digital control signals after all the Voltage References, Bias Currents and power regulators have settled and the system is ready to operate correctly The following are other aspects and embodiments:

A1. A solar photovoltaic system, comprising:

a. A plurality of photovoltaic modules, each of said photovoltaic modules having:

i. a plurality of (N) solar cells and a plurality of (M) multi-modal maximum-power-point-tracking (MPPT) DC power optimizers embedded within a protective module laminate, wherein:

1. N and M and N divided by M are positive integers greater than 1;

2. the positive and negative input electrical leads of each of said multi-modal MPPT DC power optimizers are electrically connected to the positive and negative electrical leads of a plurality of N divided by M electrically connected string of solar cells;

3. the positive and negative output electrical leads of said plurality of (M) multi-modal MPPT DC power optimizers are connected to one another within said module laminate according to an MPPT electrical interconnection design;

4. each of said plurality of photovoltaic modules have at least one pair of positive and negative electrical power leads; and, 5. said plurality of photovoltaic modules are connected to one another according to a module electrical interconnection design b. At least one electrical load connected to said plurality of photovoltaic modules connected to one another according to said module electrical interconnection design B2. The solar photovoltaic system of claim 1, wherein said solar cells are crystalline silicon solar cells.

C3. The solar photovoltaic system of claim 1, wherein said solar cells are thin-film solar cells.

D4. The solar photovoltaic system of claim 1, wherein said photovoltaic modules are crystalline silicon photovoltaic modules.

E5. The solar photovoltaic system of claim 1, wherein said photovoltaic modules are thin-film photovoltaic modules.

F6. The solar photovoltaic system of claim 1, wherein each of said multi-modal maximum-power-point-tracking (MPPT) DC power optimizers is electrically powered by photovoltaic power of each of said plurality of N divided by M electrically connected string of solar cells.

G7. The solar photovoltaic system of claim 1, wherein each of said multi-modal maximum-power-point-tracking (MPPT) DC power optimizers has a multi-modal operation algorithm comprising pass-through mode, switching MPPT optimization mode, and active bypass mode.

H8. The solar photovoltaic system of claim 1, wherein said at least one electrical load is a DC-to-AC power inverter having at least one built-in inverter maximum-power-point tracking (MPPT).

I9. The solar photovoltaic system of claim 8, wherein said at least one built-in inverter MPPT performs global system-level MPPT control and said plurality of (M) multi-modal MPPT DC power optimizers J10. The solar photovoltaic system of claim 1, wherein said at least one electrical load is a DC-to-DC power converter having at least one built-in converter maximum-power-point tracking (MPPT).

K11. The solar photovoltaic system of claim 1, wherein said protective module laminate comprises glass and encapsulant sheets attached to first sides of said plurality of (N) solar cells and plurality of (M) multi-modal maximum-power-point-tracking (MPPT) DC power optimizers, and polymeric and encapsulant sheets attached to second sides, opposite to said first sides, of said plurality of (N) solar cells and plurality of (M) multi-modal maximum-power-point-tracking (MPPT) DC power optimizers.

L12. The solar photovoltaic system of claim 1, wherein said protective module laminate comprises glass and encapsulant sheets attached to first sides of said plurality of (N) solar cells and plurality of (M) multi-modal maximum-power-point-tracking (MPPT) DC power optimizers, and glass and encapsulant sheets attached to second sides, opposite to said first sides, of said plurality of (N) solar cells and plurality of (M) multi-modal maximum-power-point-tracking (MPPT) DC power optimizers.

M13. The solar photovoltaic system of claim 1, wherein N is an integer between 10 and 1000.

N14. The solar photovoltaic system of claim 1, wherein N is an integer between 30 and 300.

O15. The solar photovoltaic system of claim 1, wherein N divided by M is an integer between 5 and 50.

P16. The solar photovoltaic system of claim 1, wherein N divided by M is an integer between 10 and 30.

Q17. The solar photovoltaic system of claim 1, wherein each of said plurality of N divided by M electrically connected string of solar cells has a series-connected string of solar cells.

R18. The solar photovoltaic system of claim 1, wherein each of said plurality of N divided by M electrically connected string of solar cells has a hybrid series and parallel connected string of solar cells.

S19. The solar photovoltaic system of claim 1, wherein said MPPT electrical interconnection design is a series interconnection of said plurality of (M) multi-modal maximum-power-point-tracking (MPPT) DC power optimizers.

T20. The solar photovoltaic system of claim 1, wherein said MPPT electrical interconnection design is a hybrid series and parallel interconnection of said plurality of (M) multi-modal maximum-power-point-tracking (MPPT) DC power optimizers.

U21. The solar photovoltaic system of claim 1, wherein said module electrical interconnection design is a series interconnection of said plurality of photovoltaic modules.

V22. The solar photovoltaic system of claim 1, wherein said module electrical interconnection design is a hybrid series and parallel interconnection of said plurality of photovoltaic modules.

W23. The solar photovoltaic system of claim 1, wherein each of said plurality of (M) multi-modal maximum-power-point-tracking (MPPT) DC power optimizers is made of one integrated circuit attached to a printed-circuit board, and at least one capacitor connected to said integrated circuit on said printed-circuit board, wherein said printed-circuit board provides said positive and negative input electrical leads and said positive and negative output electrical leads for electrical interconnections.

X24. The solar photovoltaic system, wherein said printed-circuit board further has a Schottky-barrier rectifier attached across said positive and negative output electrical leads of said multi-modal MPPT DC power optimizer.

Y25. A solar photovoltaic module, comprising:

a. A protective module laminate;

b. a plurality of (N) solar cells and a plurality of (M) multi-modal maximum-power-point-tracking (MPPT) DC power optimizers embedded within said protective module laminate, wherein:

i. N and M and N divided by M are positive integers greater than 1;

ii. the positive and negative input electrical leads of each of said multi-modal MPPT DC power optimizers are electrically connected to the positive and negative electrical leads of a plurality of N divided by M electrically connected string of solar cells;

iii. the positive and negative output electrical leads of said plurality of (M) multi-modal MPPT DC power optimizers are connected to one another within said module laminate according to an MPPT electrical interconnection design, providing at least one pair of output electrical leads from said plurality of (M) multi-modal MPPT DC power optimizers connected to one another;

c. at least one pair of positive and negative electrical power leads emanated from said protective module laminate and electrically connected to said at least one pair of output electrical leads of from said plurality of (M) multi-modal MPPT DC power optimizers connected to one another.

Z26. The solar photovoltaic module, wherein said solar cells are crystalline silicon solar cells.

AA27. The solar photovoltaic module, wherein said solar cells are thin-film solar cells.

BB28. The solar photovoltaic module, wherein said photovoltaic module is a crystalline silicon photovoltaic module.

CC29. The solar photovoltaic module, wherein said photovoltaic module is a thin-film photovoltaic module.

DD30. The solar photovoltaic module, wherein each of said multi-modal maximum-power-point-tracking (MPPT) DC power optimizers is electrically powered by photovoltaic power of each of said plurality of N divided by M electrically connected string of solar cells.

EE31. The solar photovoltaic module, wherein each of said multi-modal maximum-power-point-tracking (MPPT) DC power optimizers has a multi-modal operation algorithm comprising pass-through mode, switching MPPT optimization mode, and active bypass mode.

FF32. The solar photovoltaic module, wherein said protective module laminate comprises glass and encapsulant sheets attached to first sides of said plurality of (N) solar cells and plurality of (M) multi-modal maximum-power-point-tracking (MPPT) DC power optimizers, and polymeric and encapsulant sheets attached to second sides, opposite to said first sides, of said plurality of (N) solar cells and plurality of (M) multi-modal maximum-power-point-tracking (MPPT) DC power optimizers, providing a mono-facial solar photovoltaic module receiving light through one side of said protective module laminate having said glass sheet.

GG33. The solar photovoltaic module, wherein said protective module laminate comprises glass and encapsulant sheets attached to first sides of said plurality of (N) solar cells and plurality of (M) multi-modal maximum-power-point-tracking (MPPT) DC power optimizers, and glass and encapsulant sheets attached to second sides, opposite to said first sides, of said plurality of (N) solar cells and plurality of (M) multi-modal maximum-power-point-tracking (MPPT) DC power optimizers, providing a bi-facial solar photovoltaic module receiving light through both glass-covered sides of said protective module laminate.

HH34. The solar photovoltaic module, wherein N is an integer between 10 and 1000.

II35. The solar photovoltaic module, wherein N is an integer between 30 and 300.

JJ36. The solar photovoltaic module, wherein N divided by M is an integer between 5 and 50.

KK37. The solar photovoltaic module, wherein N divided by M is an integer between 10 and 30.

LL38. The solar photovoltaic module, wherein each of said plurality of N divided by M electrically connected string of solar cells has a series-connected string of solar cells.

MM39. The solar photovoltaic module, wherein each of said plurality of N divided by M electrically connected string of solar cells has a hybrid series and parallel connected string of solar cells.

NN40. The solar photovoltaic module, wherein said MPPT electrical interconnection design is a series interconnection of said plurality of (M) multi-modal maximum-power-point-tracking (MPPT) DC power optimizers.

OO41. The solar photovoltaic module, wherein said MPPT electrical interconnection design is a hybrid series and parallel interconnection of said plurality of (M) multi-modal maximum-power-point-tracking (MPPT) DC power optimizers.

PP42. The solar photovoltaic module, wherein said module electrical interconnection design is a series interconnection of said plurality of photovoltaic modules.

QQ43. The solar photovoltaic module, wherein said module electrical interconnection design is a hybrid series and parallel interconnection of said plurality of photovoltaic modules.

RR44. The solar photovoltaic module, wherein each of said plurality of (M) multi-modal maximum-power-point-tracking (MPPT) DC power optimizers is made of one integrated circuit attached to a printed-circuit board, and at least one capacitor connected to said integrated circuit on said printed-circuit board, wherein said printed-circuit board provides said positive and negative input electrical leads and said positive and negative output electrical leads for electrical interconnections.

SS45. The solar photovoltaic system, wherein said printed-circuit board further has a Schottky-barrier rectifier attached across said positive and negative output electrical leads of said multi-modal MPPT DC power optimizer.

TT50. The high-efficiency multi-modal maximum-power-point-tracking (MPPT) DC power optimizer integrated circuit, wherein said rectifier bypass mode utilizes a Schottky Barrier Rectifier (SBR).

UU53. The high-efficiency multi-modal maximum-power-point-tracking (MPPT) DC power optimizer integrated circuit, wherein said specified open-circuit voltage sampling period is in the range of about 2 seconds second up to about 20 seconds, corresponding to said open-circuit sampling frequency being in the range of about 0.05 hertz up to about 0.5 hertz.

VV55. The high-efficiency multi-modal maximum-power-point-tracking (MPPT) DC power optimizer integrated circuit, wherein said specified voltage sampling duration is in the range of less than 100 micro-seconds up to 1 milli-second.

WW56. The high-efficiency multi-modal maximum-power-point-tracking (MPPT) DC power optimizer integrated circuit, wherein said specified voltage sampling duration is in the range of 300 micro-seconds up to 800 micro-seconds.

XX58. The high-efficiency multi-modal maximum-power-point-tracking (MPPT) DC power optimizer integrated circuit, wherein said specified switching oscillator frequency is in the range of about 200 kilo-hertz up to about 2 mega-hertz.

YY59. The high-efficiency multi-modal maximum-power-point-tracking (MPPT) DC power optimizer integrated circuit, wherein said specified switching oscillator frequency is in the range of about 300 kilo-hertz up to about 700 kilo-hertz.

ZZ60. The high-efficiency multi-modal maximum-power-point-tracking (MPPT) DC power optimizer integrated circuit, wherein said pass-through power efficiency is at least 95%.

AAA61. The high-efficiency multi-modal maximum-power-point-tracking (MPPT) DC power optimizer integrated circuit, wherein said pass-through power efficiency is at least 98%.

BBB62. The high-efficiency multi-modal maximum-power-point-tracking (MPPT) DC power optimizer integrated circuit, wherein said optimizing power efficiency is at least 70%.

CCC63. The high-efficiency multi-modal maximum-power-point-tracking (MPPT) DC power optimizer integrated circuit, wherein said optimizing power efficiency is at least 85%.

DDD65. The high-efficiency multi-modal maximum-power-point-tracking (MPPT) DC power optimizer integrated circuit, wherein said high-side field-effect transistor has an on-state drain-to-source resistance of less than about 50 milli-ohms for said pass-through mode of operation.

EEE66. The high-efficiency multi-modal maximum-power-point-tracking (MPPT) DC power optimizer integrated circuit, wherein said high-side field-effect transistor has an on-state drain-to-source resistance of less than about 25 milli-ohms for said pass-through mode of operation.

FFF67. The high-efficiency multi-modal maximum-power-point-tracking (MPPT) DC power optimizer integrated circuit, wherein said low-side field-effect transistor has an on-state drain-to-source resistance of less than about 100 milli-ohms for said active bypass mode of operation.

GGG68. The high-efficiency multi-modal maximum-power-point-tracking (MPPT) DC power optimizer integrated circuit, wherein said low-side field-effect transistor has an on-state drain-to-source resistance of less than about 60 milli-ohms for said active bypass mode of operation.

HHH69. The high-efficiency multi-modal maximum-power-point-tracking (MPPT) DC power optimizer integrated circuit, wherein said pass-through mode of operation occurs when said high-side field-effect transistor is on 100% of the time between said open-circuit voltage sampling pulses.

III70. The high-efficiency multi-modal maximum-power-point-tracking (MPPT) DC power optimizer integrated circuit, wherein said adjustable switching duty cycle is 100% during said pass-through mode of operation.

JJJ72. The high-efficiency multi-modal maximum-power-point-tracking (MPPT) DC power optimizer integrated circuit, wherein said active bypass mode of operation occurs when said high-side field-effect transistor is off and said low-side field-effect transistor is on 100% of the time.

KKK73. The high-efficiency multi-modal maximum-power-point-tracking (MPPT) DC power optimizer integrated circuit, wherein said active shut-down mode of operation occurs when the voltage across said input positive and negative electrical leads for electrical connections to positive and negative electrical leads of said string of interconnected solar cells is too small to power up said high-efficiency multi-modal maximum-power-point-tracking (MPPT) DC power optimizer integrated circuit.

LLL74. The high-efficiency multi-modal maximum-power-point-tracking (MPPT) DC power optimizer integrated circuit, wherein said voltage across said input positive and negative electrical leads for electrical connections to positive and negative electrical leads of said string of interconnected solar cells is less than about 1 volt.

MMM75. The high-efficiency multi-modal maximum-power-point-tracking (MPPT) DC power optimizer integrated circuit, wherein said rectifier bypass mode of operation comprises a rectifier having its anode and cathode electrically connected across said output positive and negative electrical leads, with said rectifier cathode electrically connected to said output positive lead and said rectifier anode electrically connected to said output negative lead, with said rectifier being forward biased and conducting current, said high-side field-effect transistor switch being off, and said low-side field-effect transistor switch being off.

NNN76. The high-efficiency multi-modal maximum-power-point-tracking (MPPT) DC power optimizer integrated circuit, wherein said input positive and negative electrical leads have an input voltage because of electrical connections to said positive and negative electrical leads of said string of interconnected solar cells.

OOO77. The high-efficiency multi-modal maximum-power-point-tracking (MPPT) DC power optimizer integrated circuit, wherein said optimizing mode of operation regulates said input voltage to a pre-determined optimum voltage.

PPP78. The high-efficiency multi-modal maximum-power-point-tracking (MPPT) DC power optimizer integrated circuit, wherein said pre-determined optimum voltage is equal to the product of said open-circuit voltage ($V_{oc}$) of said string of interconnected solar cells and a pre-determined constant multiplying factor which is less than 1.

QQQ79. The high-efficiency multi-modal maximum-power-point-tracking (MPPT) DC power optimizer integrated circuit, wherein said pre-determined constant multiplying factor is a number between 0.65 and 0.90.

RRR80. The high-efficiency multi-modal maximum-power-point-tracking (MPPT) DC power optimizer integrated circuit, wherein said pre-determined constant multiplying factor is a number between 0.70 and 0.85.

SSS81. The high-efficiency multi-modal maximum-power-point-tracking (MPPT) DC power optimizer integrated circuit, wherein said pre-determined constant multiplying factor is a number between 0.75 and 0.80.

TTT82. The high-efficiency multi-modal maximum-power-point-tracking (MPPT) DC power optimizer integrated circuit, wherein said pre-determined constant multiplying factor is 0.76.

UUU83. The high-efficiency multi-modal maximum-power-point-tracking (MPPT) DC power optimizer integrated circuit, wherein said integrated circuit is electrically powered by said string of interconnected solar cells electrically connected and providing supply voltage to said input positive and negative electrical leads.

VVV84. The high-efficiency multi-modal maximum-power-point-tracking (MPPT) DC power optimizer integrated circuit, wherein said supply voltage is less than 18 volts.

WWW85. The high-efficiency multi-modal maximum-power-point-tracking (MPPT) DC power optimizer integrated circuit, wherein said supply voltage is in the range of 3 volts and 15 volts.

XXX86. The high-efficiency multi-modal maximum-power-point-tracking (MPPT) DC power optimizer integrated circuit, wherein said supply voltage is in the range of 4 volts and 12 volts.

YYY87. The high-efficiency multi-modal maximum-power-point-tracking (MPPT) DC power optimizer integrated circuit, wherein said supply voltage is in the range of 4.5 volts and 10.5 volts.

ZZZ88. The high-efficiency multi-modal maximum-power-point-tracking (MPPT) DC power optimizer integrated circuit, wherein said analog-to-digital-converter (ADC) based architecture for sample and hold enables reduced power consumption and relatively long sample and hold times on the order of seconds to minutes.

AAAA89. A plurality of said high-efficiency multi-modal maximum-power-point-tracking (MPPT) DC power optimizer integrated circuits, wherein a plurality of said strings of interconnected solar cells are electrically connected to a plurality of said input positive and negative electrical leads, and a plurality of said output positive and negative electrical leads are together connected in electrical series.

BBBB90. The high-efficiency multi-modal maximum-power-point-tracking (MPPT) DC power optimizer integrated circuit, wherein a capacitor is electrically connected across said input positive and negative electrical leads.

CCCC91. The high-efficiency multi-modal maximum-power-point-tracking (MPPT) DC power optimizer integrated circuit, wherein a Schottky barrier diode (SBR) is electrically connected across said output positive and negative electrical leads.

DDDD92. The high-efficiency multi-modal maximum-power-point-tracking (MPPT) DC power optimizer integrated circuit, wherein said low-profile integrated circuit package has a thickness of less than 1 mm.

EEEE93. The high-efficiency multi-modal maximum-power-point-tracking (MPPT) DC power optimizer integrated circuit, wherein said low-profile integrated circuit package has a thickness of about 0.6 mm.

FFFF94. The high-efficiency multi-modal maximum-power-point-tracking (MPPT) DC power optimizer integrated circuit, wherein said low-profile integrated circuit package has a center exposed metallic pad electrically connected to said input negative electrical and said output negative electrical lead, said center exposed pad also enabling heat sinking.

GGGG101. The multi-modal maximum-power-point-tracking power optimizer, wherein said pre-determined constant factor is a number between 0.70 and 0.85.

HHHH102. The multi-modal maximum-power-point-tracking power optimizer, wherein said pre-determined constant factor is a number between 0.75 and 0.80.

IIII103. The multi-modal maximum-power-point-tracking power optimizer, wherein said pre-determined constant factor is approximately 0.76.

JJJJ106. The multi-modal maximum-power-point-tracking power optimizer, wherein said electrical load is a DC-to-AC power inverter having an inverter maximum-power-point tracking circuit KKKK107. The multi-modal maximum-power-point-tracking power optimizer, wherein said electrical load is a DC-to-DC power converter having a converter maximum-power-point tracking circuit LLLL108. The multi-modal maximum-power-point-tracking power optimizer, wherein said inverter maximum-power-point tracking circuit controls power optimization of said string of electrically interconnected plurality of solar cells when said power optimizer operates in said pass-through mode of operation.

MMMM109. The multi-modal maximum-power-point-tracking power optimizer, wherein said converter maximum-power-point tracking circuit controls power optimization of said string of electrically interconnected plurality of solar cells when said power optimizer operates in said pass-through mode of operation.

NNNN110. The multi-modal maximum-power-point-tracking power optimizer, wherein said output string voltage is regulated to be approximately equal to said transition voltage value by adjusting said controllable switching duty cycle, when said multi-modal maximum-power-point-tracking power optimizer operates in said optimizing mode of operation.

OOOO111. The multi-modal maximum-power-point-tracking power optimizer, wherein said transition voltage value is equal to the multiplication of the actual maximum-power voltage ($V_{mp}$) of said string of electrically interconnected plurality of solar cells by a pre-determined voltage multiplier factor less than 1.

PPPP112. The multi-modal maximum-power-point-tracking power optimizer, wherein said multiplier factor is between 0.85 and 1.

QQQQ113. The multi-modal maximum-power-point-tracking power optimizer, wherein said multiplier factor is between 0.88 and 0.95.

RRRR114. The multi-modal maximum-power-point-tracking power optimizer, wherein said multiplier factor is approximately 0.90.

SSSS116. A plurality of said solar photovoltaic electrical power generators, interconnected to one another, wherein said plurality of said power optimizer output positive and negative electrical leads are connected in hybrid electrical series and parallel.

TTTT117. The multi-modal maximum-power-point-tracking power optimizer, wherein said string of electrically interconnected plurality of solar cells comprises a plurality of N series-connected solar cells, with N being an integer between 5 and 30.

UUUU118. The multi-modal maximum-power-point-tracking power optimizer, wherein said string of electrically interconnected plurality of solar cells comprises a plurality of N series-connected solar cells, with N being an integer between 8 and 24.

VVVV119. The multi-modal maximum-power-point-tracking power optimizer, wherein said open-circuit voltage value ($V_{oc}$) is in the range of about 3 volts up to 24 volts.

WWWW120. The multi-modal maximum-power-point-tracking power optimizer, wherein said open-circuit voltage value ($V_{oc}$) is in the range of about 5 volts up to 15 volts.

XXXX121. The multi-modal maximum-power-point-tracking power optimizer, wherein said power optimizer input negative electrical lead and said power optimizer output negative electrical lead are electrically connected together to form a common lead in said integrated circuit package.

YYYY122. The solar photovoltaic electrical power generator, wherein said integrated circuit package is attached to a printed-circuit board, and an input capacitor is connected across said input positive and negative electrical leads on said printed-circuit board, wherein said printed-circuit board provides electrical leads connected to said input positive and negative electrical leads and said output positive and negative electrical leads for electrical interconnections.

ZZZZ123. The solar photovoltaic electrical power generator, wherein a boost capacitor is connected across said output positive electrical lead and a boost lead of said integrated circuit package on said printed-circuit board.

AAAAA124. The solar photovoltaic electrical power generator, wherein said boost lead of said integrated circuit package is electrically connected to the gate drive boost input of said high-side field-effect transistor.

BBBBB125. The solar photovoltaic electrical power generator, wherein said integrated circuit package further has an electrical lead for enable and disable function and additional electrical leads for electrical testing and evaluation of said multi-modal maximum-power-point-tracking power optimizer.

CCCCC126. The solar photovoltaic electrical power generator, wherein electrical current flowing between said string output positive and negative electrical leads and said power optimizer input positive and negative electrical leads is in the range of 0 up to about 15 amperes.

DDDDD127. The solar photovoltaic electrical power generator, wherein electrical current flowing between said string output positive and negative electrical leads and said power optimizer input positive and negative electrical leads is in the range of 0 up to about 6 amperes.

EEEEE128. The solar photovoltaic electrical power generator, wherein electrical current flowing between said string output positive and negative electrical leads and said power optimizer input positive and negative electrical leads is in the range of 0 up to about 4 amperes.

FFFFF129. The solar photovoltaic electrical power generator, wherein said multi-modal maximum-power-point-tracking power optimizer operates in said pass-through mode of operation or said optimizing mode of operation, when said output string voltage, known as supply voltage, is in the range of approximately 5.0 volts to 10.5 volts when the voltage is rising, and approximately 4.75 volts to 10.5 volts when the voltage is falling.

GGGGG130. The solar photovoltaic electrical power generator, wherein said multi-modal maximum-power-point-tracking power optimizer operates in said active bypass mode of operation when said output string voltage, known as supply voltage, is in the range of approximately 4.5 volts to 5.0 volts when the voltage is rising, and approximately 4.25 volts to 4.75 volts when the voltage is falling.

HHHHH131. The solar photovoltaic electrical power generator, wherein said multi-modal maximum-power-point-tracking power optimizer operates in said optimizing mode of operation when at least a portion of said string of electrically interconnected plurality of solar cells is shaded.

IIIII132. The solar photovoltaic electrical power generator, wherein said multi-modal maximum-power-pointtracking power optimizer operates in said rectifier mode of operation, when said output string voltage, known as supply voltage, is in the range of approximately 0 volt to 4.5 volts when the voltage is rising, and approximately 4.25 volts to 4.75 volts when the voltage is falling, and voltage across said power optimizer output positive and negative electrical leads is less than −0.8 volt.

JJJJJ133. The solar photovoltaic electrical power generator, wherein said rectifier bypass mode of operation forward biases a rectifier electrically connected with its cathode and anode electrically connected to said power optimizer output positive and negative electrical leads, respectively, and turns off both said high-side field-effect transistor and low-side field-effect transistor.

KKKKK134. The multi-modal maximum-power-point-tracking power optimizer, wherein said controllable switching duty cycle is 100% during said pass-through mode of operation.

LLLLL135. The multi-modal maximum-power-point-tracking power optimizer, wherein said controllable switching duty cycle is greater than 0% and less than 100% during said optimizing mode of operation.

FIG. 7 is a table showing an MPPT optimizer consistent with FIG. 6A in different modes consistent with the exemplary operating mode thresholds described herein.

The foregoing description of the exemplary embodiments is provided to enable any person skilled in the art to make or use the claimed subject matter. Various modifications to these embodiments will be readily apparent to those skilled in the art, and the generic principles defined herein may be applied to other embodiments without the use of the innovative faculty. Thus, the claimed subject matter is not intended to be limited to the embodiments shown herein but is to be accorded the widest scope consistent with the principles and novel features disclosed herein.

The invention claimed is:

1. A multi-modal maximum-power-point-tracking (MPPT) integrated circuit for optimization of power of a string of interconnected solar cells, comprising:

a sample and hold circuit having open-circuit voltage sampling pulses for periodic measurements of open-circuit voltage ($V_{OC}$) of said string of interconnected solar cells at a specified frequency and pulse duration;

a device for measuring the open-circuit voltage of said string of interconnected solar cells and calculating a multiplier of said open-circuit voltage as the maximum-power-point set-point;

a high-side field-effect transistor switch (high-side FET switch);

a low-side field-effect transistor switch (low-side FET switch);

a switching circuit operating at a specified frequency and with an adjustable switching duty cycle;

a multi-modal control algorithm providing shutdown mode when said integrated circuit is turned off, a pass-through mode having a pass-through power efficiency, an optimizing mode having an optimizing power efficiency, and an active bypass mode to increase photovoltaic power from string of interconnected solar cells;

an under-voltage lockout (UVLO) circuit to monitor the voltage of said string of interconnected solar cells, to enable said active bypass mode, and to protect said MPPT integrated circuit during power up and power down;

wherein said high-side FET switch is connected to a first FET driver capable of either turning it on or off;

wherein said low-side FET switch is connected to a second FET driver capable of either turning it on or off; and wherein said MPPT integrated circuit operates in said active bypass mode of operation when the voltage of said string of interconnected solar cells falls below a UVLO threshold voltage setting while being sufficiently large to avoid said shutdown mode of operation, by turning on said low-side FET switch and turning off said high-side FET switch.

2. The multi-modal maximum-power-point-tracking (MPPT) integrated circuit of claim 1, wherein said multi-modal control algorithm further includes a rectifier bypass mode of operation.

3. The multi-modal maximum-power-point-tracking (MPPT) integrated circuit of claim 2, wherein said rectifier bypass mode of operation is configured for use with a Schottky barrier rectifier coupled across output positive and output negative electrical leads of said integrated circuit.

4. The multi-modal maximum-power-point-tracking (MPPT) integrated circuit of claim 1, wherein said optimization of power comprises an electronic circuit voltage regulator for regulating the operating voltage of said string of interconnected solar cells.

5. The multi-modal maximum-power-point-tracking (MPPT) integrated circuit of claim 1, wherein said specified voltage sampling duration is in the range of less than 100 micro-seconds up to 10 milli-seconds.

6. The multi-modal maximum-power-point-tracking (MPPT) integrated circuit of claim 1, wherein said high-side field-effect transistor and said low-side field-effect transistor are n-channel field-effect transistors (NMOS transistors).

7. The multi-modal maximum-power-point-tracking (MPPT) integrated circuit of claim 1, wherein said optimizing mode of operation is a switching mode of operation with said high-side field-effect transistor being on with said adjustable switching duty cycle being greater than 0 and less than 100% of the time between said open-circuit voltage sampling pulses.

8. The multi-modal maximum-power-point-tracking (MPPT) integrated circuit of claim 1, wherein said multi-modal power optimization control algorithm utilizes a transition voltage value obtained by multiplying said open-circuit voltage by a pre-determined constant factor.

9. The multi-modal maximum-power-point-tracking (MPPT) integrated circuit of claim 8, wherein said pre-determined constant factor is a number between 0.65 and 0.90.

10. The multi-modal maximum-power-point-tracking (MPPT) integrated circuit of claim 9, wherein said multiplier is a pre-determined constant factor between 0.75 and 0.80.

11. The multi-modal maximum-power-point-tracking (MPPT) integrated circuit of claim 1, wherein said device comprises an 8-bit analog-to-digital converter (ADC) configured to digitize said open-circuit voltage (VOC) and an 8-bit digital-to-analog converter (DAC) configured to generate a control signal corresponding to said maximum-power-point set-point.

12. The multi-modal maximum-power-point-tracking (MPPT) integrated circuit of claim 1, wherein, in said optimizing mode of operation, said adjustable switching duty cycle is adjusted to regulate an operating voltage of said string of interconnected solar cells toward said maximum-power-point set-point.

13. The multi-modal maximum-power-point-tracking (MPPT) integrated circuit of claim 1, wherein said maximum-power-point set-point is based on a most-recent measured open-circuit voltage (VOC) obtained during a prior open-circuit voltage sampling pulse and is maintained until a subsequent open-circuit voltage sampling pulse updates said maximum-power-point set-point.

14. The multi-modal maximum-power-point-tracking (MPPT) integrated circuit of claim 1, wherein said integrated circuit package comprises a BOOST lead configured to be coupled to an external boost capacitor for driving said high-side FET switch.

15. The multi-modal maximum-power-point-tracking (MPPT) integrated circuit of claim 1, further comprising a soft-landing circuit configured to ramp said adjustable switching duty cycle during a transition from said shutdown mode of operation to said optimizing mode of operation and/or said pass-through mode of operation.

16. The multi-modal maximum-power-point-tracking (MPPT) integrated circuit of claim 1, wherein, in said pass-through mode of operation, said high-side FET switch is maintained substantially on between said periodic open-circuit voltage sampling pulses and said low-side FET switch is maintained off.

17. The multi-modal maximum-power-point-tracking (MPPT) integrated circuit of claim 1, wherein said high-side FET switch has an on-state drain-to-source resistance less than 25 milliohms and said low-side FET switch has an on-state drain-to-source resistance less than 60 milliohms.

18. The multi-modal maximum-power-point-tracking (MPPT) integrated circuit of claim 1, wherein said periodic measurements occur at a repetition period in a range of 2 seconds to 20 seconds.

19. The multi-modal maximum-power-point-tracking (MPPT) integrated circuit of claim 1, wherein said specified frequency of said switching circuit is in a range of 300 kHz to 700 kHz.

20. The multi-modal maximum-power-point-tracking (MPPT) integrated circuit of claim 1, wherein said integrated circuit is packaged in a low-profile package having a thickness of less than 1 mm and having an exposed metallic pad for heat sinking.

* * * * *